(12) United States Patent
Ito

(10) Patent No.: US 12,081,717 B2
(45) Date of Patent: Sep. 3, 2024

(54) IMAGE PROCESSING APPARATUS THAT STORES A TICKET, METHOD OF CONTROLLING IMAGE PROCESSING APPARATUS, AND STORAGE MEDIUM

(71) Applicant: CANON KABUSHIKI KAISHA, Tokyo (JP)

(72) Inventor: Asami Ito, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/352,540

(22) Filed: Jul. 14, 2023

(65) Prior Publication Data

US 2024/0040059 A1  Feb. 1, 2024

(30) Foreign Application Priority Data

Jul. 28, 2022  (JP) ................. 2022-120979

(51) Int. Cl.
*H04N 1/00* (2006.01)
*G06F 21/33* (2013.01)
*G06K 7/14* (2006.01)
*H04N 1/44* (2006.01)

(52) U.S. Cl.
CPC .......... *H04N 1/444* (2013.01); *G06F 21/335* (2013.01); *G06K 7/1417* (2013.01); *H04N 1/00334* (2013.01); *H04N 1/00408* (2013.01); *H04N 1/00517* (2013.01); *H04N 2201/3205* (2013.01); *H04N 2201/3269* (2013.01)

(58) Field of Classification Search
USPC .................................... 358/1.9, 358
See application file for complete search history.

(56) References Cited

U.S. PATENT DOCUMENTS

| | | | | |
|---|---|---|---|---|
| 2013/0125134 | A1* | 5/2013 | Ota | G06F 21/608 718/106 |
| 2013/0188203 | A1* | 7/2013 | Homma | H04N 1/00204 358/1.9 |
| 2014/0029032 | A1* | 1/2014 | Hilbert | H04N 1/00307 358/1.15 |
| 2014/0253933 | A1* | 9/2014 | Selvaraj | G06F 3/04847 358/1.15 |
| 2015/0036163 | A1* | 2/2015 | Selvaraj | H04N 1/00503 358/1.13 |

(Continued)

FOREIGN PATENT DOCUMENTS

JP  2012054728 A  3/2012

*Primary Examiner* — Henok Shiferaw
(74) *Attorney, Agent, or Firm* — ROSSI, KIMMS & McDOWELL LLP

(57) ABSTRACT

A hold scan control unit of an image processing apparatus provided with a scanner accepts a selection of a ticket that has a sharing setting to share the ticket, wherein the ticket is stored in the image processing apparatus and includes one or more settings required for scan processing executed by the scanner and for transmission processing of a file that includes an image that has been generated by the scan processing, acquires an access token based on the authorization of a user that uses the ticket in a case in which the ticket is used by a user that is different from the user that is set in the selected ticket and, executes the scan processing and the transmission processing by using the acquired access token according to a setting that is included in the ticket.

8 Claims, 24 Drawing Sheets

(56) References Cited

U.S. PATENT DOCUMENTS

| | | | | |
|---|---|---|---|---|
| 2015/0081702 A1* | 3/2015 | Kato | ................... | H04L 67/1097 |
| | | | | 707/736 |
| 2017/0187908 A1* | 6/2017 | Katano | .............. | H04N 1/00204 |
| 2021/0409554 A1* | 12/2021 | Ito | ...................... | H04N 1/00209 |
| 2024/0028271 A1* | 1/2024 | Mizuno | ................. | G06F 3/1207 |

* cited by examiner

FIG. 8

```
                                  ┌─800
                    ┌─────────────────────────────────────────┐
                    │         Hold scan application           │
                    ├─────────────────────────────────────────┤
                    │ Hold scan ticket setting                │
         801 ──────── Scan setting                            │
                    │     Document size   [ A4         ▼ ]    │
                    │     Color           [ Black and white ▼]│
                    │     File type       [ PDF        ▼ ]    │
                    │                                         │
         802 ──────── Storage destination                     │
                    │     Server   storageA         ┌─804     │
                    │     Path     keiyaku\20220516 [Path selection]│
                    │                                         │
         803 ──────── Name          [ Contract document scan ]│
                    │                                         │
         805 ──────── Reuse setting  ○Not to be reused  ●To be reused │
                    │                ※However, reusable within validity period of │
                    │                  authentication information │
                    │                                         │
         806 ──────── Sharing setting  ○Only self  ●Share with other user │
         807 ──────── User authentication of printer          │
                    │     ID        [ abc123              ]   │
                    │                                         │
                    │                     [  OK  ]  [ Cancel ]│
                    └─────────────────────────────────────────┘
```

FIG. 9

| Scan ticket ID ~901 | Scan setting ~902 | Storage destination ~903 | Name ~904 | Reuse ~905 | Share ~906 | User authentication ~907 | |
|---|---|---|---|---|---|---|---|
| | | | | | | ID | Access token |
| abc@8754dolf | A4, Full color, PDF | storageA(172.54.3.98) keiyaku¥20220516 | Contract scan | TRUE | TRUE | abc123 | abcd9876qq |
| ...... | ...... | ...... | ...... | ...... | ...... | ...... | ...... |

FIG. 21

| Scan ticket ID ~901 | Scan setting ~902 | Storage destination ~903 | Name ~904 | Reuse ~905 | Sharing ~906 | User authentication ~907 | |
|---|---|---|---|---|---|---|---|
| | | | | | | ID | Access token ~2100 |
| abc@8754dolf | A4, Full color, PDF | storageA(172.54.3.98) keiyaku¥20220516 | Contract document scan | TRUE | TRUE | abc123 | abcd9876qq |
| oo*7768cdjisa | A4, Full color, PDF | storageA(172.54.3.98) keiyaku¥20220516 | Contract document scan | TRUE | FALSE | xyz789 | xxx6543wyz ~2101 |
| ...... | | | | | | xyz789 | xxx6543wyz ~2110 |
| | | | | | | ...... | |

IMAGE PROCESSING APPARATUS THAT STORES A TICKET, METHOD OF CONTROLLING IMAGE PROCESSING APPARATUS, AND STORAGE MEDIUM

BACKGROUND OF THE INVENTION

Field of the Invention

The present invention relates to an image processing apparatus provided with a scanner, a method of controlling the image processing apparatus, and a storage medium.

Description of the Related Art

In recent years, it has become increasingly common for companies to digitize paper documents using image processing apparatuses. Japanese Unexamined Patent Application Publication No. 2012-54728 discloses a system in which an image reading setting and a storage destination for a read image are stored on a server in advance as a scan ticket, and the stored scan ticket is used when an image is read by an image processing apparatus. In addition, when saving a scan ticket to a server, it is possible to set the scan ticket to be reusable, or to grant a sharing setting that enables users other than the scan ticket creator to use the scan ticket. When sharing a scan ticket, by granting an access right to a storage destination that has been set in the scan ticket by the creator of the scan ticket, it is possible to transmit the image to the storage destination, even if the scan ticket user does not have access rights to the storage destination.

However, in the technology disclosed in Japanese Patent Application Publication No. 2012-54728, access to the storage destination of the image that has been set in the scan ticket is authenticated by username and password, and does not include the use of an access token. In addition, access tokens based on authorization via protocols such as OAuth 2.0, as defined in the RFC (Request For Comments), which are necessary for accessing storage servers such as cloud-based storage servers that serve as a storage destination, generally have expiration periods. Therefore, in a case in which a scan ticket granted with the access token of the creator is shared, there is a risk that if the access token has expired, another user may be unable to use the scan ticket. Furthermore, even in a case in which a different user uses a scan ticket for which the scan ticket creator has been granted access rights, in a case in which the different user has access rights to the storage destination, it is desirable for the different user to store the ticket by using their own access rights. However, there is currently no consideration of a unit to change only the access rights of a scan ticket, and it is necessary to newly create a scan ticket, which is a burden for the user.

SUMMARY OF THE INVENTION

The present invention aims to enhance the convenience of reusing a scan ticket.

An image processing apparatus according to the present invention is provided with a scanner, the image processing apparatus configured to include an accepting unit that accepts a selection of a ticket that has a sharing setting to share the ticket, wherein the ticket is stored in the image processing apparatus and includes one or more settings required for scan processing that is executed by the scanner and for transmission processing of a file that includes an image that has been generated by the scan processing, an acquisition unit that acquires an access token based on authorization of a user that uses the ticket when the ticket is used by a user that is different from the user set in the selected ticket, and an executing unit that executes the scan processing and the transmission processing according to a setting included in the ticket by using the acquired access token.

Further features of the present invention will become apparent from the following description of exemplary embodiments with reference to the attached drawings.

BRIEF DESCRIPTION OF THE DRAWINGS

FIG. 8 is a diagram showing an example of a hold scan setting screen.

FIG. 9 is a diagram showing an example of a scan ticket.

FIG. 21 is a diagram showing an example of a scan ticket after processing is completed.

DESCRIPTION OF THE EMBODIMENTS

First Embodiment

Figure 1:
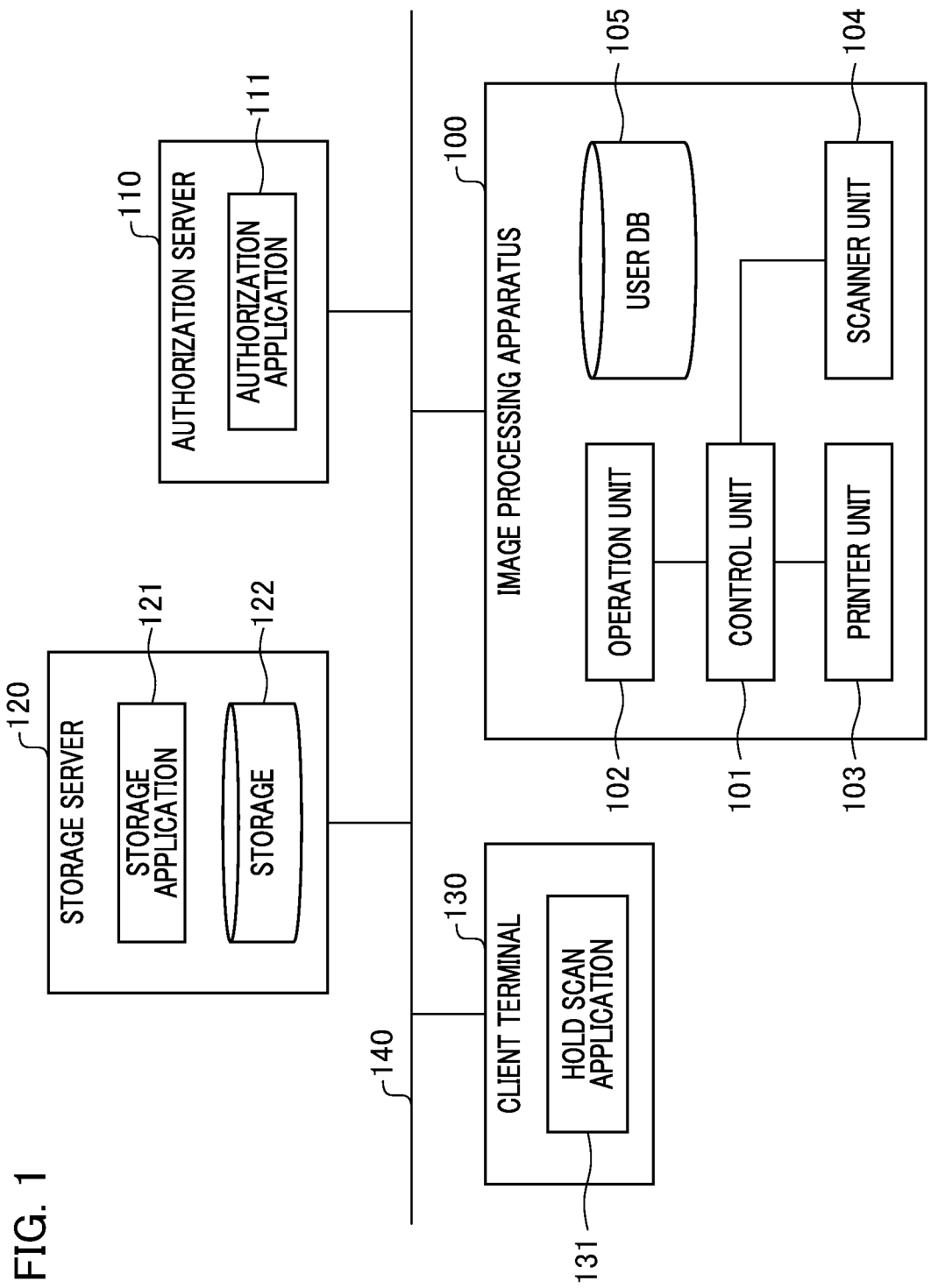
FIG. 1 is a diagram showing a configuration example of a system.

FIG. 1 is a diagram showing a configuration example of a system of the present embodiment. The system provides a scanning service that integrates an image processing apparatus provided with a scanner, a client terminal such as a PC or a smartphone, an authorization server, and a storage server. The system in the present embodiment includes an image processing apparatus 100, an authorization server 110, a storage server 120, and a client terminal 130. The image processing apparatus 100, the authorization server 110, the storage server 120, and the client terminal 130 are connected to each other via a network 140.

The image processing apparatus 100 is an image processing apparatus provided with a scanner. The image processing apparatus 100 is, for example, a multifunction peripheral (MFP) that reads an image with a scanner or prints an image with a printer. The image processing apparatus 100 includes an operation unit 102, a control unit 101, a printer unit 103, a scanner unit 104, and a user DB (database) 105. It should be noted that the image processing apparatus 100 may include other functions such as a FAX function, a BOX function, and the like.

The scanner unit 104 optically reads an original document set on a document plate or Auto Document Feeder (ADF) (not shown) to generate image data (image file) which is electronic data. In addition, the image processing apparatus 100 of the present embodiment is capable of performing hold scan processing. Hold scan processing is processing that includes scanning and transmission, which is executed by specifying a hold scan job stored (held) in the non-volatile area of the image processing device 100 and instructing it to be executed by the operation of a logged-in user. A hold scan processing job is transmitted from the client terminal 130 to the image processing apparatus 100 as a scan ticket that includes the scan settings, a destination (storage destination), and a token.

The printer unit 103 forms an image corresponding to the received print job and outputs the image to a paper sheet, or optically reads a document image set in the scanner unit 104 and outputs the image to a paper sheet. The operation unit 102 accepts an operation from the user, and also displays information to the user. The operation unit 102 is, for example, a touch panel, and the user performs an instruction such as a job execution instruction to the image processing apparatus 100 on the user interface screen that has been displayed on the touch panel. The control unit 101 controls the entire image processing apparatus 100. The operation unit 102, the printer unit 103, and the scanner unit 104 are connected to the control unit 101, and each function in the MFP is implemented according to the control of the control unit 101. The user DB 105 is a database in which information of a user of the image processing apparatus is stored. The information of the user of the image processing apparatus is used for user authentication that is performed when the image processing apparatus 100 is used.

The storage server 120 provides a cloud storage service for storing various types of data. In the present embodiment, the storage server 120 stores image data that has been generated by scanning in the image processing apparatus 100. The storage server 120 includes a storage application 121 and a storage 122. The storage application 121 receives an instruction from the client terminal 130 and performs various processes, such as storing files in the storage 122, and returning a list of files and directories that have been stored in the storage 122. The storage 122 stores image data and the like. It should be noted that in addition to one or a plurality of information processing apparatuses, a service or functionality provided by the storage server 120 may be implemented by a virtual machine (cloud service) that uses resources provided by a data center that includes information processing apparatuses, or by a combination thereof.

The authorization server 110 manages authorization for a client to access the storage server 120. The authorization server 110 includes an authorization application 111. In the present embodiment, although the authorization application 111 is explained as an example in which authorization information is exchanged in accordance with the OAuth mechanism specified in RFC 6479, it is not limited thereto. The authorization application 111 issues an access token that includes authorization information, and the client terminal 130 receives a service provided by the storage server 120, which is a resource server, by using the access token.

When the client terminal 130 requests access to the storage server 120 with the appropriate authentication information, the authorization application 111 issues an access token to the client terminal 130 to grant access authority to the storage server 120. The client terminal 130 performs an access request to the storage server 120 by using the issued access token. The storage server 120 confirms the validity of the access token that has been passed from the client terminal 130 to the authorization server 110. The authorization server 110 determines the validity of the access token, and returns the determination result to the storage server 120. The storage server 120 accepts access from the client terminal 130 in a case in which the access token is valid. In contrast, in a case in which the access token is not valid, the access of the client terminal 130 is rejected. It should be noted that in addition to one or a plurality of information processing apparatuses, a service or functionality provided by the authorization server 110 may be implemented by a virtual machine (cloud service) that uses resources provided by a data center that includes information processing apparatuses, or by a combination thereof.

The client terminal 130 is, for example, an information processing apparatus such as a smartphone or a PC. The client terminal 130 includes a hold scan application 131. The hold scan application 131 creates a hold scan job as a scan ticket for performing hold scan processing in the image processing apparatus 100. The scan ticket includes one or more settings required for the scan processing that is executed by the scanner and the transmission processing of a file that includes the image that was generated by the scan processing. In addition, whether or not the scan ticket can be reused and whether or not the scan ticket can be shared can be set in the scan ticket of the present embodiment. Specifically, the scan ticket of the present embodiment includes information of a scan setting, a setting of a storage destination for the scanned image file, a reuse setting of the scan ticket, and a sharing setting of the scan ticket. The hold scan application 131 transmits the defined scan ticket to the image processing apparatus 100.

The network 140 may be configured by any of a communications network, such as a local area network (LAN), a wide area network (WAN), a cellular network (for example, LTE or 5G and the like), a wireless network, Wi-Fi, a telephone line, or a dedicated digital line, or a combination thereof. The network to which the image processing apparatus 100, the authorization server 110, the storage server 120, and the client terminal 130 connect may not all be the same type of network. For example, a configuration is possible in which the image processing apparatus 100, the authorization server 110, and the storage server 120 are connected to the Internet via a wire, and the client terminal 130 is connected via a data communication line. That is, the network 140 may be configured to be capable of transmitting and receiving data, and any communication mode may be used.

Figure 2:
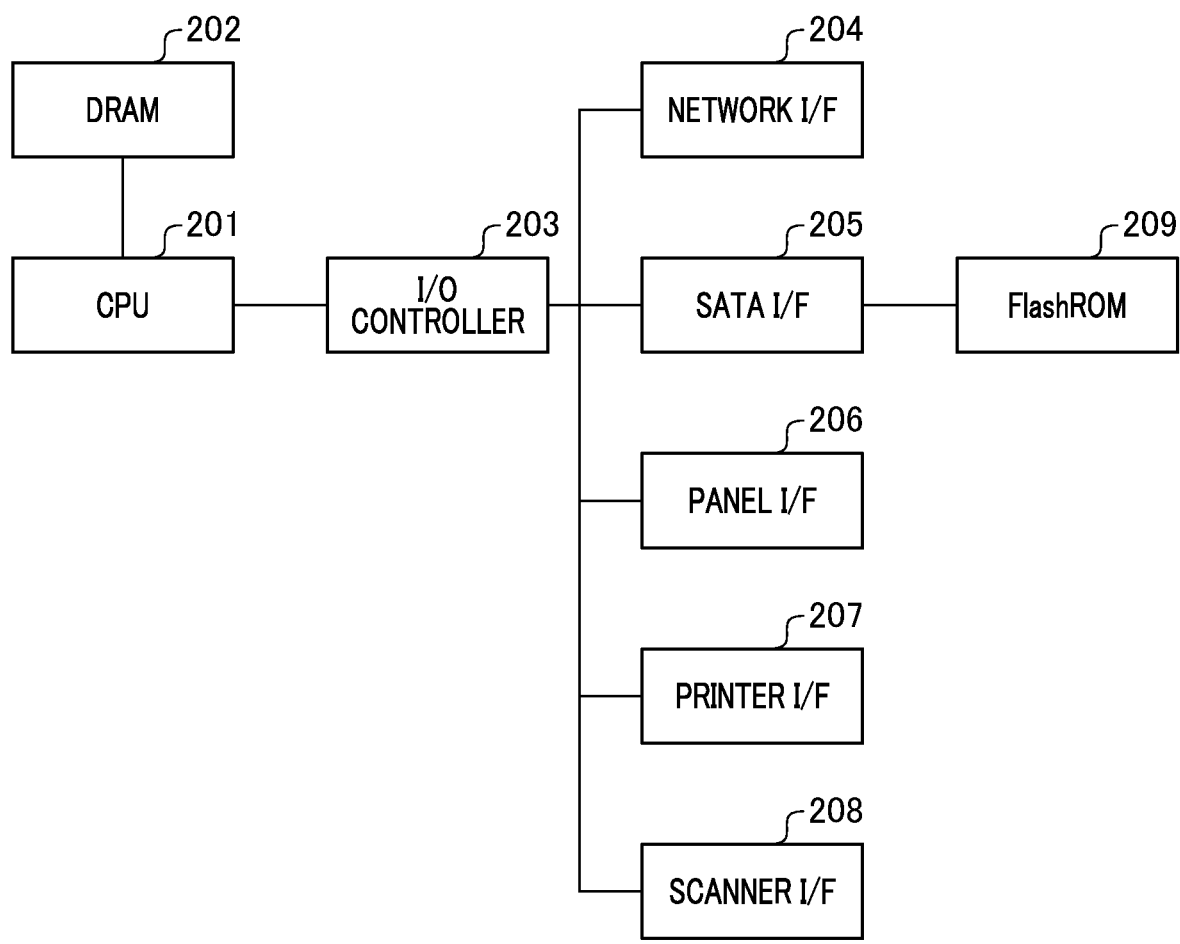
FIG. 2 is a diagram showing a hardware configuration of a control unit of an image processing apparatus.

FIG. 2 is a diagram showing a hardware configuration of the control unit 101 of the image processing apparatus 100. The control unit 101 includes a CPU 201, a DRAM 202, an I/O controller 203, a network I/F 204, a SATA I/F 205, a panel I/F 206, a printer I/F 207, a scanner I/F 208, and a FlashROM 209. The CPU 201 controls the entire image processing apparatus 100 by performing calculation processing. The CPU 201 is connected to the DRAM 202 via a bus. The DRAM 202 is used by the CPU 201 as a work memory for temporarily storing program data expressing a calculation command or data to be processed in the course of calculation processing by the CPU 201. In addition, the CPU 201 connects to the I/O controller 203 via the bus. The I/O controller 203 controls input/output to various devices such as the operation unit 102, the printer unit 103, the scanner unit 104, and external devices according to an instruction of the CPU 201.

The I/O controller 203 is connected to the FlashROM 210 via a Serial Advanced Technology Attachment (SATA) I/F 205. The CPU 201 is used to permanently store a program and a document file to implement the functions of the image processing apparatus 100 in the FlashROM 210. The CPU 201 uses the FlashROM 210 to permanently store programs and document files necessary for implementing the functions of the image processing apparatus 100. It should be noted that a mass storage device such as a hard disk drive (HDD) may be connected to the SATA I/F 205 instead of a Flash ROM.

In addition, the I/O controller 203 is connected to the network I/F 204, the panel I/F 206, the printer I/F 207, and the scanner I/F 208. The network 140 is connected to the network I/F 204. The CPU 201 realizes communication with external devices such as the client terminal 130 and the storage server 120 that are connected to the network 140 via the network I/F 204 and the network 140. The CPU 201 realizes user-oriented input and output to the operation unit 102 via the panel I/F 206. The CPU 201 realizes the print processing by using the printer unit 103 via the printer I/F 207. The CPU 201 realizes the scan processing by using the scanner unit 104 via the scanner I/F 208.

Here, an example in which the image processing unit 100 implements the copy function will be explained. The CPU 201 reads program data from the FlashROM 210 into the DRAM 202 via the SATA I/F 205. The CPU 201 detects a copy instruction from the user to the operation unit 102 via the panel I/F 206 according to the program loaded in the DRAM 202. When the CPU 201 detects the copy instruction, the CPU 201 receives the document as electronic data from the scanner section 104 via the scanner I/F 208 and stores the electronic data in the DRAM 202. The CPU 201 performs image processing, such as color conversion processing suitable for output, on the image data stored in the DRAM 202. Then, the CPU 201 sends the image data after image processing stored in the DRAM 202 to the printer unit 103 via the printer I/F 207 and performs output processing to a paper medium.

In addition, an example in which the image processing unit 100 implements the transmission function will be explained. The processing by which the CPU 201 detects a transmission instruction from the user is the same as for the copy function described above. A transmission instruction includes a transmission protocol from the user, a destination designation, an image format and the like. A transmission protocol may be a server message block (SMB), the file transfer protocol (FTP), and the like, and the destination designation may be specified, for example, by the Universal Naming Convention (UNC). The image format is a JPEG, a PDF, and the like. When the CPU 201 detects a transmission instruction, it receives the document as electronic data from the scanner unit 104 via the scanner I/F 208 and stores the data in the DRAM 202. The CPU 201 performs image format conversion and the like on the image data stored in the DRAM 202 according to the designation by the user. The CPU 201 stores the image data stored in the DRAM 202 by transmitting the image data to the destination via the network I/F 204 in the protocol specified by the user. The storage server 130 may be designated as the destination, and transmission may be performed by using an authorization mechanism that uses an access token.

Figure 3:
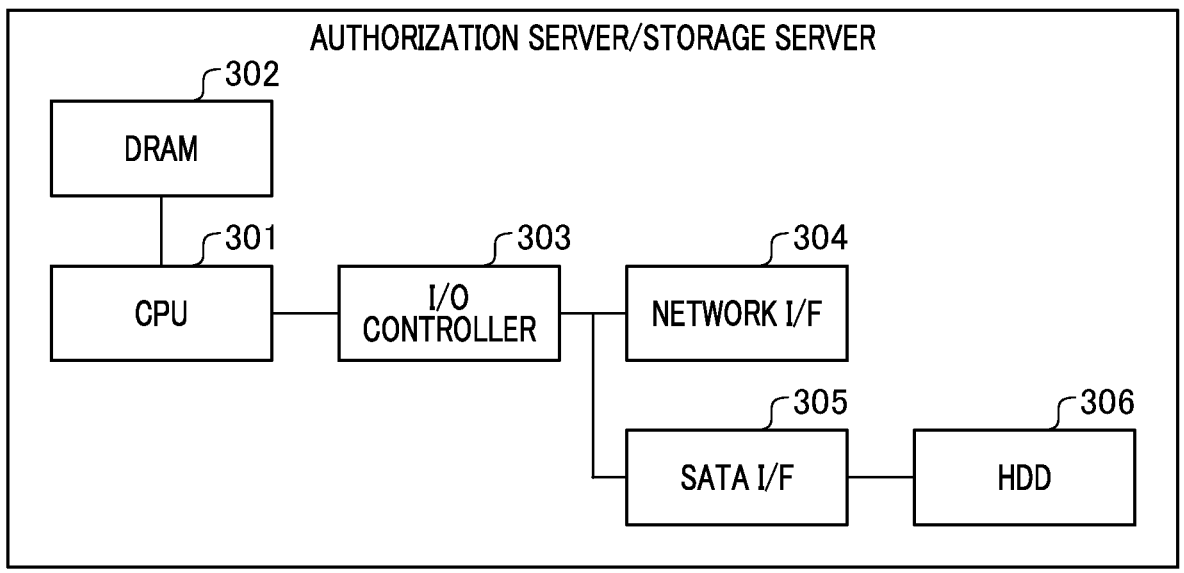
FIG. 3 is a diagram showing a hardware configuration of a control unit of an authorization server and a storage server.

FIG. 3 is a diagram showing a hardware configuration of the authorization server 110 and the storage server 120. An example of a configuration of the authorization server 110 will be explained later. It should be noted that, similar to the authorization server 110, the storage server 120 also includes a configuration of a computer having a processor (CPU) and a memory. The authorization server 110 includes a CPU 301, a DRAM 302, an I/O controller 303, a network I/F 304, a SATA I/F 305, and an HDD 306.

The CPU 301 controls the entire authorization server 110. The CPU 301 is connected to the DRAM 302 via a bus. The DRAM 302 is used by the CPU 301 as a work memory for temporarily storing program data representing a calculation command or data to be processed in the course of calculation processing by the CPU 301. In addition, the CPU 301 is connected to the I/O controller 303 via the bus.

The I/O controller 303 controls input and output with respect to an external device or a storage device according to an instruction from the CPU 301. The I/O controller 303 is connected to the network I/F 304. The network I/F 304 is connected to the network 140. The CPU 301 realizes communication with an external device on the network 140 via the network I/F 304 and the network 140. The I/O controller 303 is connected to the HDD 306 via the Serial Advanced Technology Attachment (SATA) I/F 305. The HDD 306 is an example of a storage apparatus and stores a program, such as the authorization application 111, and setting values and the like. The HDD 306 in the storage server 120 stores a program, such as a storage application 121, and setting values and the like.

In the present embodiment, although the various processes shown in the flowchart described later are illustrated by using one CPU 301 and one memory (DRAM 302) for the purpose of explanation, another configuration may be used. For example, a plurality of processors, a RAM, a ROM, and a storage can work together to perform each of the processing shown in the flowchart described later. In addition, a plurality of server computers may also be used to perform each processing.

Figure 4:
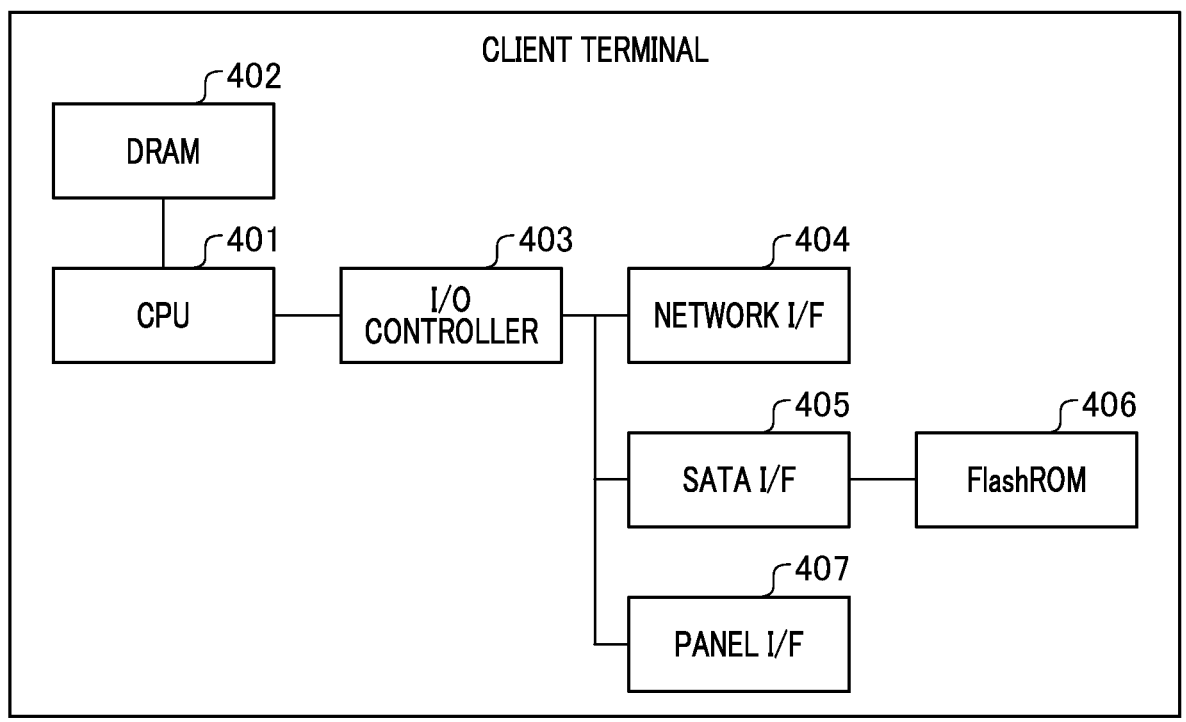
FIG. 4 is a diagram showing a hardware configuration of a control unit of a client terminal.

FIG. 4 is a block diagram showing a hardware configuration of the client terminal 130. The client terminal 130 includes a CPU 401, a DRAM 402, an I/O controller 403, a network I/F 404, a SATA I/F 405, a FlashROM 406, and a panel I/F 407. The CPU 401 controls the entire client terminal 130. The CPU 401 is connected to the DRAM 402 via a bus. The DRAM 402 is used by the CPU 401 as a work memory for temporarily storing program data representing a calculation command or data to be processed in the course of calculation processing by the CPU 401.

In addition, the CPU 401 is connected to the I/O controller 403 via a bus. The I/O controller 403 controls input and output with respect to an external device, a storage unit, and an operation unit, according to an instruction from the CPU

401. The I/O controller 403 is connected to the network I/F 404. The network I/F 404 is connected to the network 140. The CPU 401 realizes communication with an external device on the network 140 via the network I/F 404 and the network 140.

The I/O controller 403 connects to the FlashROM 406 which is a storage device, via the Serial Advanced Technology Attachment (SATA) I/F 405. It should be noted that the storage device is not limited to a Flash ROM, and may be a mass storage device such as an HDD. The FlashROM 406 is used to store programs such as the hold scan application 131 and the like, and various setting values. In addition, the I/O controller 403 connects to the panel I/F 407 The CPU 401 realizes user-oriented input and output to the operation unit of the client terminal 130 that is connected via the panel I/F 407 An operation unit is, for example, a touch panel, a camera that is an image reading apparatus, and the like.

Figure 5:
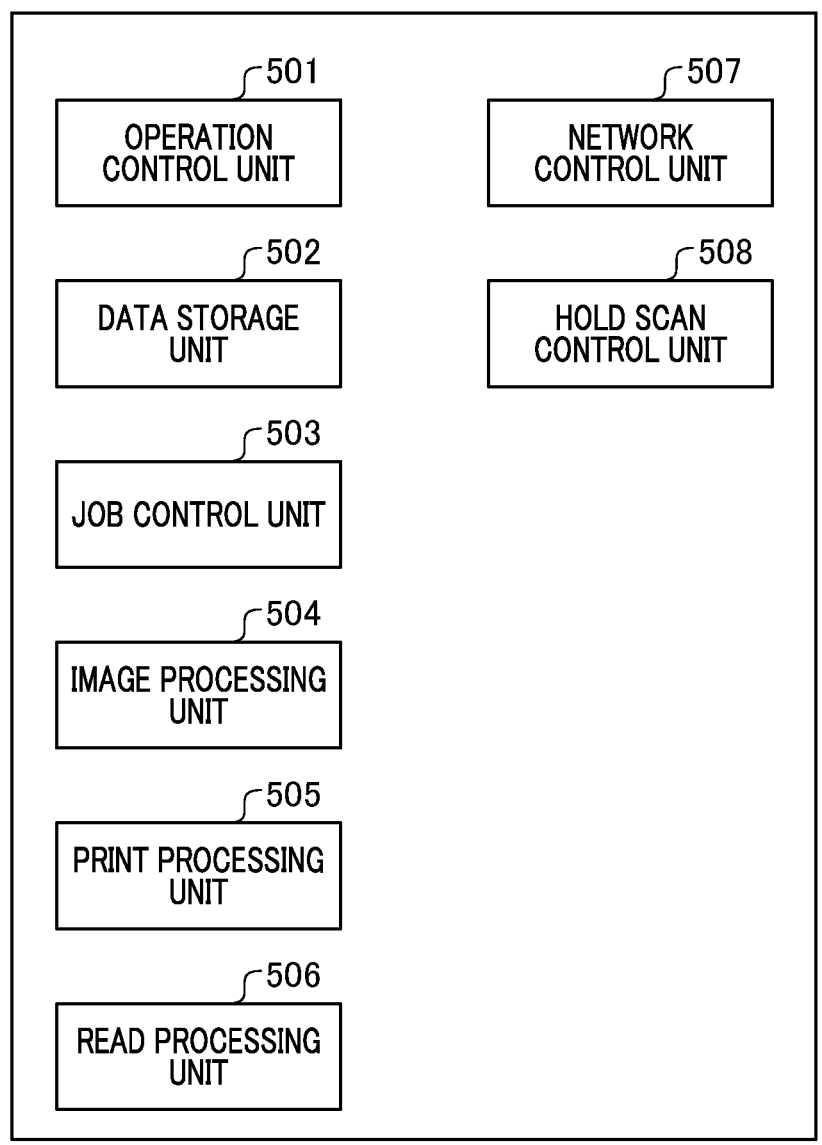
FIG. 5 is a diagram showing a software configuration of an image processing apparatus.

FIG. 5 is a diagram showing a software configuration of the image processing apparatus 100. The software configuration of the image processing apparatus 100 is realized by the CPU 201 of the control unit 101 executing a program that has been stored in the FlashROM 211 after reading the program into the DRAM 202. The image processing apparatus 100 includes an operation control unit 501, a data storage unit 502, a job control unit 503, an image processing unit 504, a print processing unit 505, a read processing unit 506, a network control unit 507, and a hold scan control unit 508.

The operation control unit 501 controls the display and the acceptance of operations in the operation unit 102. Specifically, the operation control unit 501 displays a screen image for the user on the operation unit 102. In addition, the operation control unit 501 detects a user operation and executes processing that is associated with a screen component, such as a button, displayed on the screen. The data storage unit 502 controls recording to the FlashROM 211 and reading from the FlashROM 211. For example, the data storage unit 502 stores a request from another unit in the FlashROM 211.

The job control unit 503 performs control of job execution. The image processing unit 504 processes image data into a format suitable for the application thereof according to an instruction from the job control unit 503. The print processing unit 505 controls print processing by the printer unit 103. Specifically, the print processing unit 505 prints and outputs an image on a paper media via the printer I/F 207 according to an instruction from the job control unit 503.

The read processing unit 506 controls the scan processing by the scanner unit 104. Specifically, the read processing unit 506 reads the set document through the scanner I/F 208 according to an instruction from the job control unit 503. The network control unit 507 controls the input and output of data with an external device via the network I/F 204 and the network 140. In addition, the data storage unit 502 enables data stored in the FlashROM 210 to be accessed by an external device via the network control unit 507. An example of data stored in the FlashROM 210 is image data such as PDF or JPEG.

The hold scan control unit 508 controls processing with respect to a hold scan. For example, the hold scan control unit 508 stores a scan ticket received from an external device such as the client terminal 130 via the network control unit 507. In addition, the hold scan control unit 508 controls processing to cause the scan ticket to be displayed on the operation unit 102 by instructing the operation unit 102 to display the scan ticket. The hold scan control unit 508 functions as an accepting unit that accepts a selection of a scan ticket by the user. The hold scan control unit 508 functions as an acquisition unit that acquires a selection of a scan ticket by the user. Further, the hold scan control unit 508 also functions as an executing unit that executes the scan job based on the definition of the scan ticket and controls processing to transmit the image data and the like read by the reading processing unit 506 to the storage server 120 via the network control unit 507.

Figure 6:
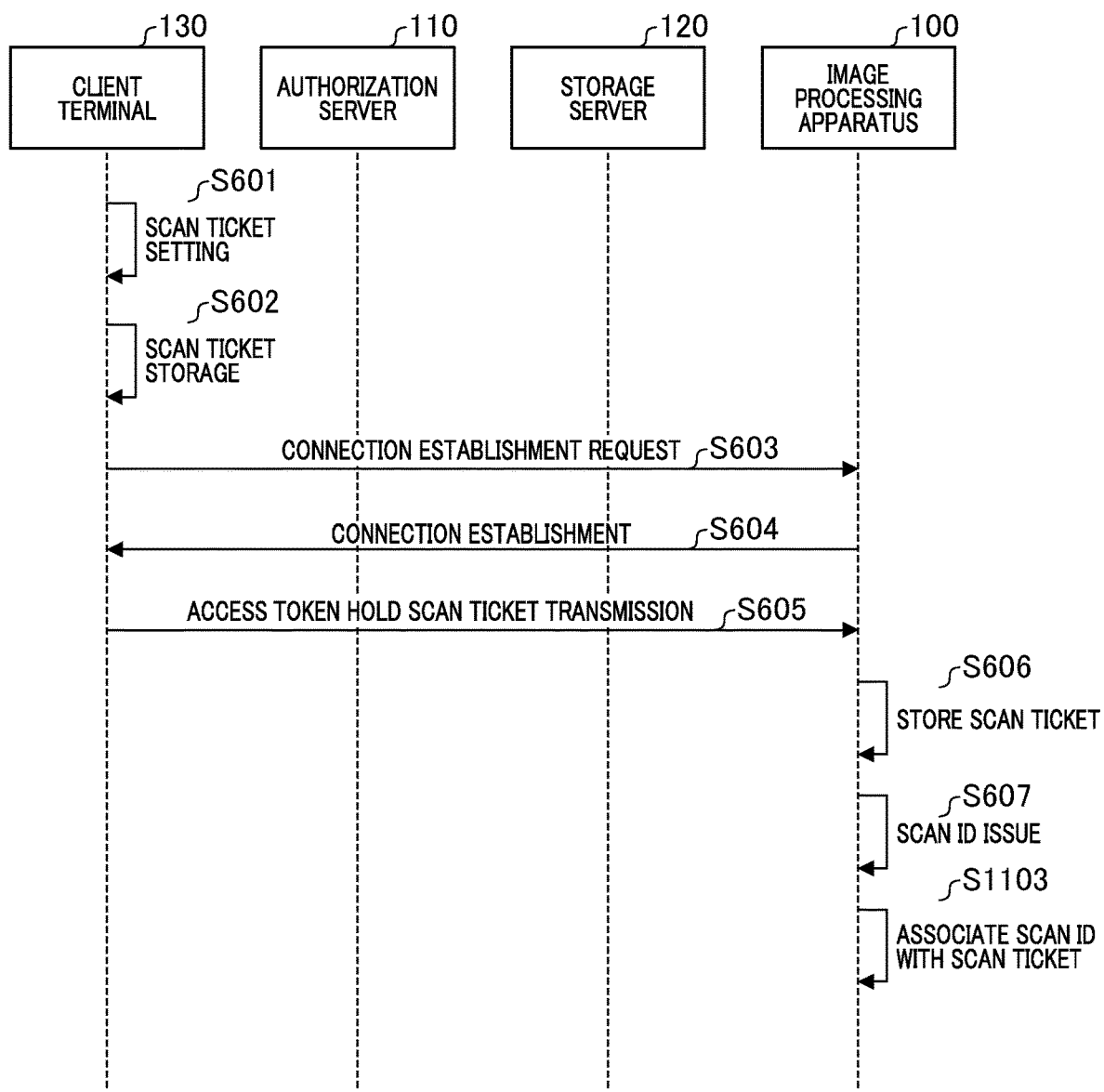
FIG. 6 is a sequence diagram showing a series of processing for generating a scan ticket and storing the scan ticket in an image processing apparatus.

The operation of the present embodiment will be explained with reference to FIG. 6 to FIG. 24. FIG. 6 is a sequence diagram showing a series of processing for generating a scan ticket and storing the scan ticket in the image processing apparatus 100. In this series of processing, first, a scan ticket that defines a scan setting, a storage location setting on the storage server 120, a reuse setting, and a sharing setting is created by the hold scan application 131 on the client terminal 130. Then, the client terminal 130 transmits the scan ticket to the image processing apparatus 100, and the scan ticket is stored in the image processing apparatus 100.

Each of the processing operations that is executed by the image processing apparatus 100 shown in FIG. 6 is realized by the CPU 201 loading a program stored in the FlashROM 210 into the DRAM 202 and executing the program. Each of the processing operations performed by the client terminal 130 shown in FIG. 6 is realized by the CPU 401 reading a program stored in the FlashROM 406 into the DRAM 402 and executing the program. This processing is initiated by the user initiating the setting of the hold scan processing at the client terminal 130. It should be noted that in the following sequence, an explanation with respect to an operation in a case in which an error is not essential to the essence of the present embodiment will be omitted.

In step S601, the hold scan application 131 of the client terminal 130 performs setting of the scan ticket. The scan ticket defines the settings of the scan job. That is, the hold scan application 131 performs the setting of the scan job in step S601. Specifically, the hold scan application 131 displays the hold scan settings screen and accepts input of the hold scan settings by the user. FIG. 8 is a diagram showing an example of a hold scan setting screen. The hold scan setting screen 800 is displayed on a screen of the client terminal 130 by the hold scan application 131. In the hold scan setting screen 800, a scan setting 801, a storage destination 802, a name 803, a reuse setting 805, a sharing setting 806, and user authentication information 807, for example, are displayed. A scan setting 801 is an item for performing a scan setting. In the scan setting 801, for example, settings such as a document size setting such as A3 or A4, a color setting such as full color or grayscale, and a file type setting for the image file to be saved such as JPEG or PDF are performed. The storage destination 802 is an item for specifying the location in which the image data generated by the scan is stored. In the storage destination, for example, setting of the destination server and path and the like is performed. A name 803 is an item for setting the name of the hold scan job. A path selection button 804 is a button for selecting a storage destination path. When the path selection button 804 is pressed, the hold scan application 131 acquires an access token and displays the directory list screen of the server. The user selects the storage destination path from the directory list screen, and the hold scan application 131 sets the storage destination by receiving the selection of the user. In a case in which the storage server 120 is set as the storage destination, the user selects the path to the storage destination from the directory list screen of the storage server 120. It should be noted that in the present embodiment, the storage server 120 as the server of the storage destination 802 and the image processing apparatus 100 as the destination for transmitting the hold scan job are assumed to have already been specified by the client terminal 130 in advance. A sequence for acquiring an access token and acquiring a directory list is described later by using FIG. 7.

The reuse setting 805 is an item for setting whether the created scan ticket can be reused or not. In a case in which a scan ticket is selected to be reusable in the reuse setting 805, it becomes possible to use the created scan ticket again only within the validity period of the access token. The sharing setting 806 is an item for setting whether the created scan ticket can be used only by the user who created the scan ticket, or whether the scan ticket can also be used by other users. The user authentication information 807 is an item that sets information used in user authentication of the image processing apparatus 100 that performs a hold scan. As user authentication information 807, for example, a user ID that is stored in the user DB 105 of the image processing apparatus 100 can be used again. It should be noted that the setting of the hold scan that is shown in FIG. 8 is an example, and if the present embodiment can be realized, other settings may be possible, or only some of the settings may be possible. For example, the scan setting may be set to be other than this, or the name of the hold scan job may not be set. In addition, it may be possible to enable the setting of the image processing apparatus which is the destination of the hold scan job for transmission on the hold scan setting screen 800.

In step S602, the hold scan application 131 of the client terminal 130 stores the scan ticket set in step S601 in the client terminal 130. In step S603, the hold scan application 131 of the client terminal 130 transmits a connection establishment request to the image processing apparatus 100. In step S604, the network control unit 507 of the image processing apparatus 100 processes the connection establishment request from the client terminal 130, and establishes a connection to perform notification to the client terminal 130 from the image processing apparatus 100. The process of establishing a connection uses, for example, the WebSocket protocol as specified in RFC 6455. The establishment of the connection enables the transmission of the storage result to the storage server 120 from the image processing apparatus 100 to the client terminal 130.

In step S605, the hold scan application 131 of the client terminal 130 transmits the scan ticket that was stored in step S602 to the image processing apparatus 100. It should be noted that the request from the client terminal 130 to the image processing apparatus 100 may be made to the storage server 120 by using a general-purpose mechanism defined by a REpresentation State Transfer (REST) API or the like. In addition, the connection between the image processing apparatus 100 and the client terminal 130 that was established in steps S603 and S604 may be used.

In step S606, the hold scan control unit 508 of the image processing unit 100 stores the content of the scan ticket that was received from the hold scan application 131 of the client terminal 130 inside the image processing apparatus 100. In step S607, the hold scan control unit 508 of the image processing apparatus 100 issues a scan ticket ID. A scan ticket ID is information that uniquely identifies a scan ticket. In step S608, the hold scan control unit 508 of the image processing apparatus 100 stores by associating the scan ticket ID that was issued in step S607 with the scan ticket that was stored in step S606.

Here, a scan ticket that is stored in association with a scan ticket ID in the image processing apparatus 100 will be explained. FIG. 9 is a diagram showing an example of a scan ticket. A scan job setting that is defined in a scan ticket includes, for example, a scan ticket ID 901, a scan setting 902, a storage destination 903, a name 904, a reuse 905, a share 906, and a user authentication 907.

The scan ticket ID 901 is information that is issued in step S607, and is for uniquely identifying the scan ticket that was associated with the scan ticket in step S608. The scan setting 902, the storage destination 903, the name 904, the reuse 905, the share 906, and the user authentication 907 are the settings that were set in step S601 on the hold scan setting screen 800. The scan setting 902 corresponds to the scan setting 801. The storage destination 903 corresponds to the storage destination 802. The name 904 corresponds to the name 803. The reuse 905 corresponds to the reuse setting 805. The value that is entered in the reuse 905 is TRUE/FALSE. The value is set to TRUE in a case in which "Reuse" is selected in the reuse setting 805, and set to FALSE otherwise. The share 906 corresponds to the sharing setting 806. The value that is entered in the share 906 is TRUE/FALSE. The value is set to TRUE in a case in which "Share with other user" is selected in the sharing setting 806, and set to FALSE otherwise. The ID of the user authentication 907 corresponds to the user authentication information 807. The access token of the user authentication 907 is an access token that is used to store the file at the destination in the transmission process, and is acquired by the process shown in FIG. 7. It should be noted that in the present embodiment, a value that is entered in the reuse 905 and the share 906 was set to TRUE/FALSE, but another value may be entered so as to enable determination.

Figure 7:
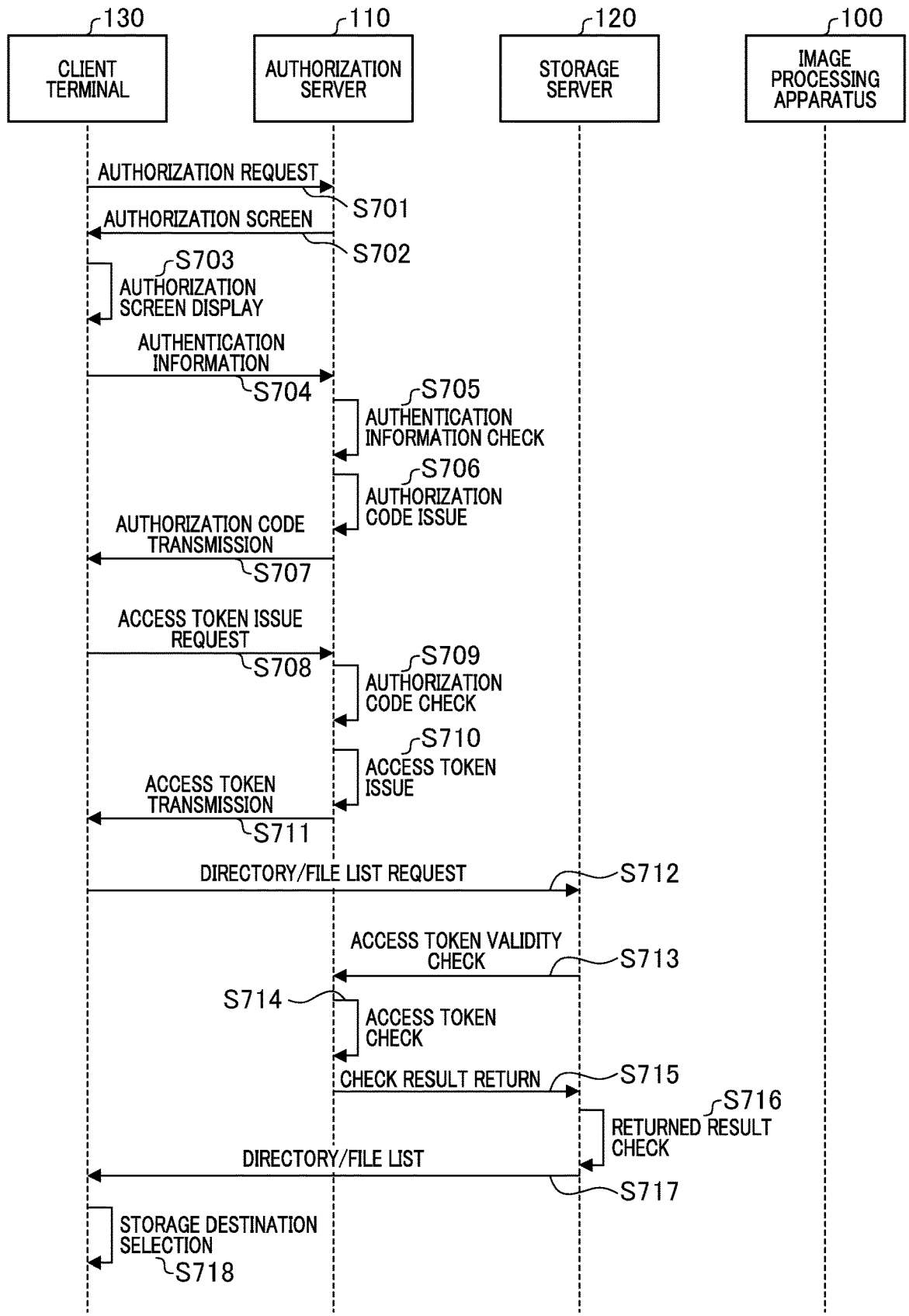
FIG. 7 is a sequence diagram of the processing by which a client terminal sets a storage destination of a storage server.

FIG. 7 is a sequence diagram of the processing by which the client terminal 130 sets a storage destination of the storage server. In the present processing, first, the hold scan application 131 of the client terminal 130 acquires an access token for access to the storage server 120. Then, the storage destination of the hold scan is set. Each of the processing operations that is executed by the client terminal 130 shown in FIG. 7 is realized by the CPU 401 loading a program stored in the FlashROM 406 into the DRAM 402 and executing the program. In addition, each of the processing operations that is executed by the authorization server 110 and the storage server 120 shown in FIG. 7 is realized by each CPU 301 loading a program stored in the HDD 306 into the DRAM 302 and executing the program. When the setting of the storage destination of the data generated by the scan starts in the hold scan application 131 of the client terminal 130, that is, when the setting of the storage destination 802 of the hold scan setting screen 800 starts, the present processing is started. It should be noted that in the present embodiment, it is assumed that the storage server 120 has been previously designated by the client terminal 130 as the server of the storage destination 802.

In step S701, the hold scan application 131 of the client terminal 130 transmits an authorization request to the authorization server 110 for storage access of the storage server 120. In step S702, the authorization application 111 of the authorization server 110 instructs the hold scan application 131 of the client terminal 130 to display an authorization screen. It should be noted that it is assumed that the hold scan application 131 of the client terminal 130 has applied for authorization to access the storage server 120 in advance.

Figure 10:
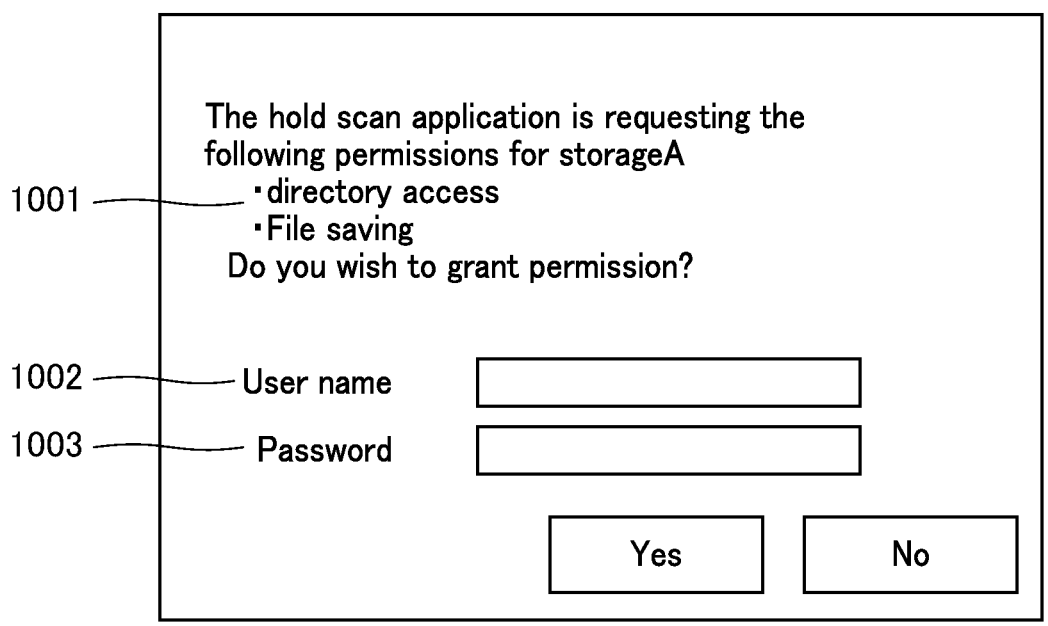
FIG. 10 is a diagram showing an example of an authorization screen.

In step S703, the hold scan application 131 of the client terminal 130 displays the authorization screen on the client terminal 130. FIG. 10 is a diagram showing an example of an authorization screen. In an authorization screen 1000, a display of an authorization 1001 for the storage server 120, and an input field of a user name 1002 used as authentication information in user authentication and an input field of a password 1003 are displayed. In a case in which the user grants access to the storage server 120, the user inputs the user name 1002 and the password 1003, and presses the selection to grant access.

In step S704, the hold scan application 131 of the client terminal 130 transmits the authentication information to the authorization server 110. The authentication information is a combination of a user name and a password that was input on the authorization screen 1000 in step S703. In step S705, the authorization application 111 of the authorization server 110 performs authentication based on the authentication information transmitted from the client terminal 130 in step S704. For example, the authorization application 111 checks whether the authentication information received from the client terminal 130 is valid authentication information by checking whether the authentication information matches the combination of a user name and a password managed in an authentication information DB of the authorization server 110. In a case in which the authorization application 111 determines that the authentication information that was transmitted from the client terminal 130 in step S705 is valid, the authorization application 111 performs the processing of step S706. In step S706, the authorization application 111 of the authorization server 110 issues an authorization code. In step S707, the authorization application 111 of the authorization server 110 transmits the authorization code issued in step S706 to the client terminal 130.

In step S708, the hold scan application 131 of the client terminal 130 transmits the authorization code acquired in step S707 to the authorization server 110, and performs an issue request of an access token. In step S709, the authorization application 111 of the authorization server 110 checks whether the authorization code passed from the client terminal 130 in step S708 is valid. In a case in which it has been determined that the authorization code transmitted from the client terminal 130 is valid, the authorization application 111 performs the processing of step S710. In step S710, the authorization application 111 of the authorization server 110 issues an access token and a refresh token. In step S711, the authorization application 111 of the authorization server 110 transmits the access token and the refresh token issued in step S710 to the client terminal 130.

In step S712, the hold scan application 131 of the client terminal 130 transmits the access token received at step S711 to the storage server 120, and requests the acquisition of a list of directories and files. In step S713, the storage application 121 of the storage server 120 checks the validity of the access token received from the client terminal 130 in step S712 with the authorization server 110. That is, the storage application 121 transmits the access token received from the client terminal 130 to the authorization server 110, and requests that the validity of the access token be checked. In step S714, the authorization application 111 of the authorization server 110 checks the validity of the access token received from the storage server 120 at step S713. In step S715, the authorization application 111 of the authorization server 110 returns a result of the validity check of the access token to the storage server 120.

In step S716, the storage application 121 of the storage server 120 checks the result of the validity check of the access token returned from the authorization server 110. In a case in which the access token is valid, the storage server 120 performs the processing of step S717. In contrast, in a case in which the access token is invalid, error processing (not shown) is performed. In step S717, the storage application 121 of the storage server 120 returns a list of directories and files on the storage server 120 to the client terminal 130. In step S718, the hold scan application 131 of the client terminal 130 sets the storage destination of the scan data from the directory list. Specifically, the directory list of the storage server 120 acquired from the storage server 120 is displayed, and the user operating the client terminal 130 receives the storage destination selected from the directory list and sets the selected storage destination as the storage destination.

In the present embodiment, an example of performing user authentication by a combination of a user ID and a password has been explained, but it is not limited thereto. For example, other authentication methods, such as biometrics, may be used. In addition, in the present embodiment, although an example in which a list of files and directories of the storage server 120 is returned only one time in step S717, a list of files and directories may be transmitted a plurality of times. For example, the client terminal 130 and the storage server 120 may communicate a plurality of times by repeatedly returning a list of files and directories in the moved destination directory to move the hierarchy of directories. In addition, although an example of using an authorization code to issue an access token has been shown, an access token can be issued by another method. For the sake of simplicity, the present sequence omits a description of checking whether an authorization code or an access token has expired, but the acquisition of an authorization code or an access token need not be performed every time. It is sufficient to check whether the authorization code or the access token has expired and to obtain the authorization code or the access token only in a case in which the authorization code or the access token has expired.

Figure 11:
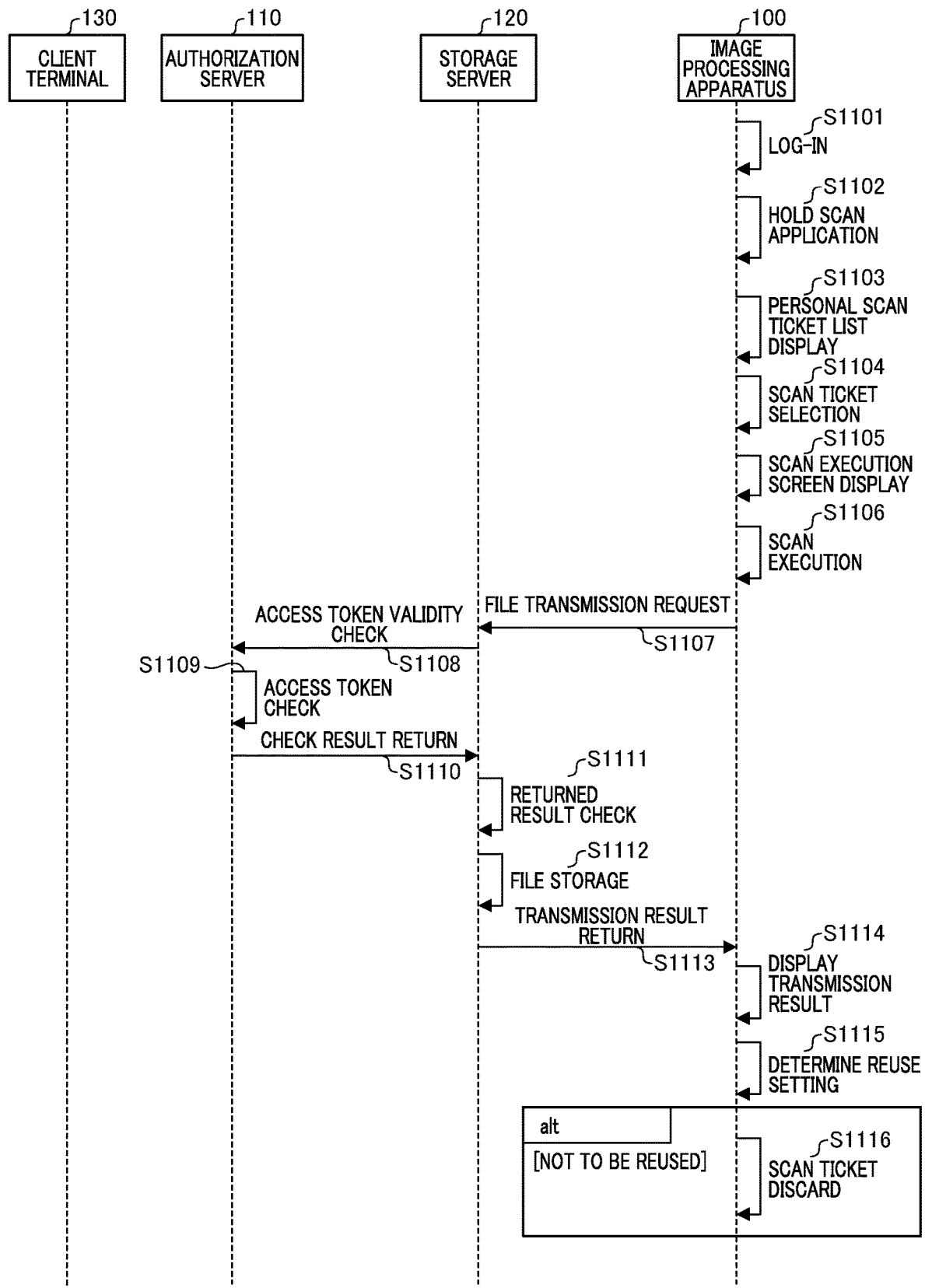
FIG. 11 is a sequence diagram showing hold scan processing.

FIG. 11 is a sequence diagram showing hold scan processing. Here, it is assumed that a scan ticket is held (is stored) in a nonvolatile area of the image processing apparatus 100 by the scan ticket storage processing shown in FIG. 6. In addition, the scan ticket is assumed to be a scan ticket with the reuse 905 set to FALSE and the share 906 set to FALSE. In the hold scan processing, a scan job (scan ticket) is instructed to be executed by specifying the scan job by a user operation of a user logged into the image processing apparatus 100, thereby executing processing that includes scanning and transmission. In the present embodiment, an example of storing a scanned image on the storage server 120 will be explained.

Each processing that is executed by the image processing apparatus 100 shown in FIG. 11 is realized by the CPU 201 loading a program stored in the FlashROM 210 into the DRAM 202 and executing the program. Each of the processing operations that is executed by the image processing apparatus 100 shown in FIG. 11 is realized by the CPU 401 loading the program stored in FlashROM 406 into the DRAM 402 and executing the program. In addition, each processing that is executed by the authorization server 110 and the storage server 120 shown in FIG. 11 is realized by each CPU 301 thereof loading a program stored in the HDD 306 into the DRAM 302 and executing the program.

This process is initiated, for example, by a user selecting an icon corresponding to a hold scan in the operation unit 102 of the image processing apparatus 100. In step S1101, the operation control unit 501 of the image processing apparatus 100 receives a login operation by the user and executes a login processing. In the login processing, the operation control unit 501 identifies the user based on, for example, a combination of an ID and a password that has been input by the user or information that has been read from the IC card of the user and the like.

Figure 12:
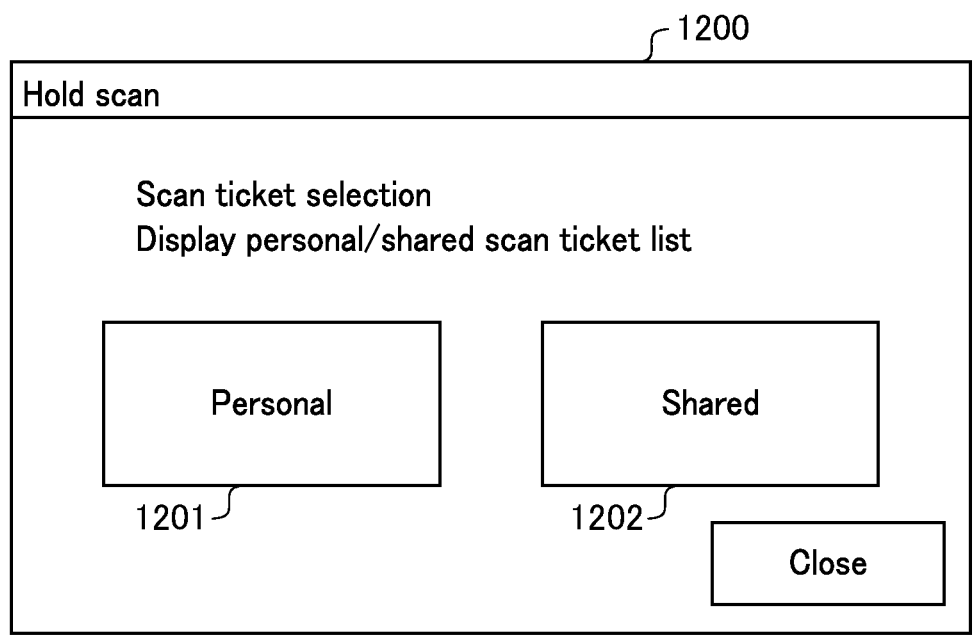
FIG. 12 is a diagram showing an example of a scan ticket selection screen.

In step S1102, the hold scan control unit 508 of the image processing apparatus 100 starts a hold scan application based on a user operation in the operation unit 102 and displays a scan ticket selection screen. For example, the hold scan control unit 508 displays the scan ticket selection screen 1200 shown in FIG. 12 on the operation unit 102 by the user selecting an icon corresponding to the hold scan application on the home screen displayed on the operation unit 102. FIG. 12 is a diagram showing an example of a scan ticket selection screen. The scan ticket selection screen 1200 is a screen for selecting whether to display a list of scan tickets associated with an individual or a list of shared scan tickets. The scan ticket selection screen 1200 displays a personal button 1201 and a shared button 1202. The user selects the personal button 1201 in a case in which they wish to view a list of scan tickets associated with an individual. In contrast, the user selects the shared button 1201 in a case in which they wish to view a list of shared scan tickets. The hold scan control unit 508 receives a selection of the user in the scan ticket selection screen 1200, and in a case in which the personal button 1201 is selected, the processing of step S1103 is performed. In contrast, in a case in which the shared button 1202 is selected, the processing of step S1503 shown in FIG. 15 that is described below is performed.

Figure 13:
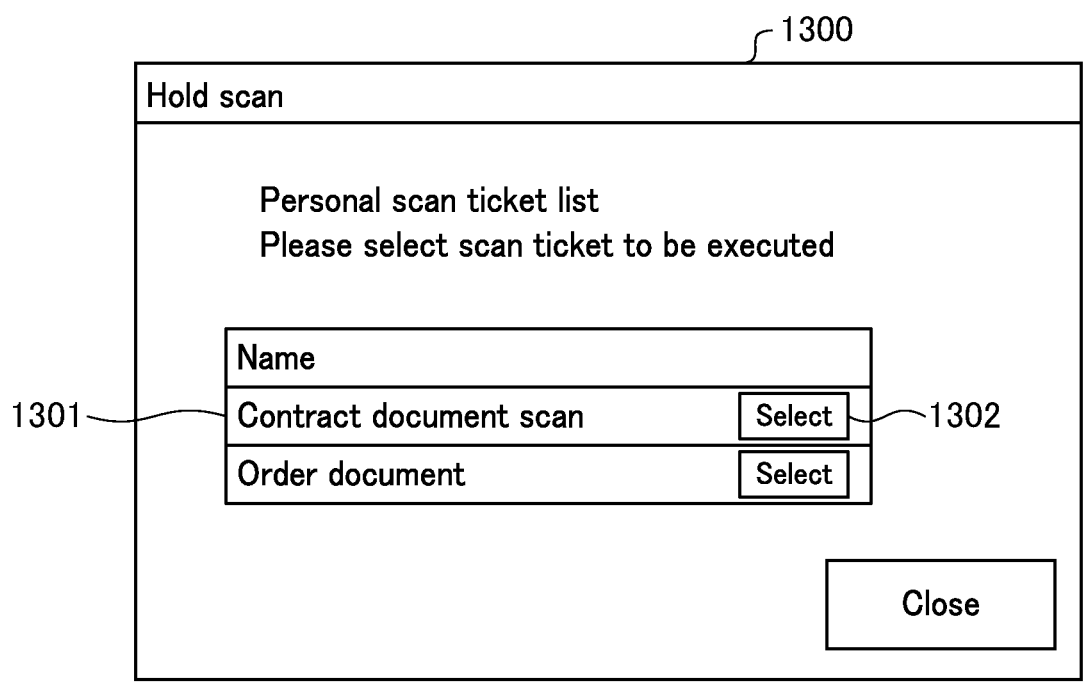
FIG. 13 is a diagram showing an example of a personal scan ticket list screen.

In step S1103, the hold scan control unit 508 of the image processing apparatus 100 displays a personal scan ticket list screen on the operation unit 102. FIG. 13 is a diagram showing an example of a personal scan ticket list screen. A personal scan ticket list screen 1300 displays a list of scan tickets for which the share 906 of the scan ticket is set to FALSE and the ID in the user authentication 907 matches the login user information of the image processing apparatus 100. The personal scan ticket list screen 1300 displays, for example, the name 1301 of the scan ticket and a button 1302 for selecting the scan ticket. In addition, the personal scan ticket list screen 1300 may display other information such as a scan setting or the date and time at which the scan ticket was stored. On the personal scan ticket list screen 1300, the user performs an operation of choosing the scan ticket they wish to execute by selecting the corresponding button 1302.

Figure 14:
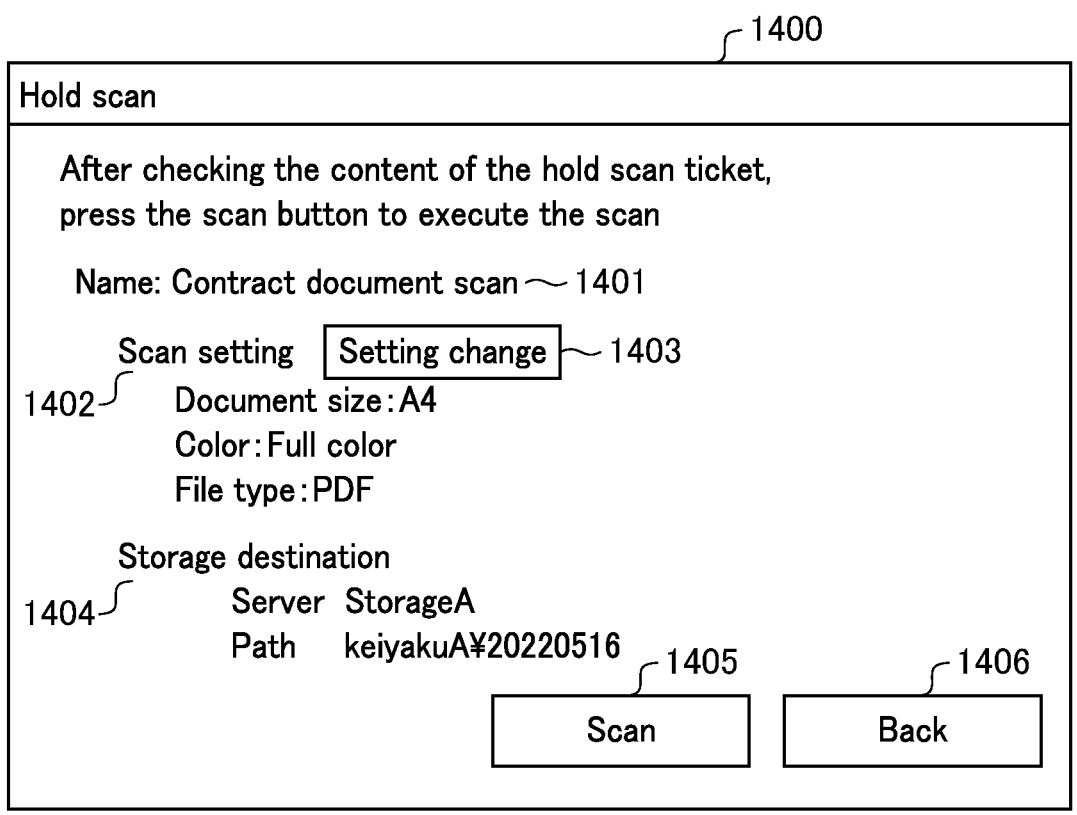
FIG. 14 is a diagram showing an example of a hold scan execution screen.

In step S1104, the hold scan control unit 508 of the image processing apparatus 100 accepts a selection of a scan ticket by the user. In step S1105, the hold scan control unit 508 of the image processing apparatus 100 displays the hold scan execution screen corresponding to the scan ticket selected in step S1104. FIG. 14 is a diagram showing an example of a hold scan execution screen. In a hold scan execution screen 1400, for example, a name 1401 of a scan ticket, a scan setting 1402, a storage destination 1404, a scan execution button 1405, and a back button 1406 are displayed. The name 1401 is the name of the selected scan ticket and corresponds to the name 904 defined in the scan ticket. The scan setting 1402 is a scan setting that has been set for the selected scan ticket and corresponds to the scan setting 902 that is defined in the scan ticket. It should be noted that the scan setting displayed in the scan setting 1402 can be changed by selecting a setting change button 1403 in the hold scan execution screen 1400. When the user selects the setting change button 1403, the hold scan control unit 508 displays a scan setting change screen (not shown) on the operation unit 102. The user can change a setting that is different from the scan setting set in the scan ticket at the client terminal 130 on the scan setting change screen. In a case in which a scan setting has been changed in the scan setting change screen, the hold scan control unit 508 displays the scan setting after the change in the scan setting 1402. The storage destination 1404 is a storage destination of the scanned image data that has been set in the selected scan ticket, and corresponds to the storage destination 903 defined in the scan ticket. In the present embodiment, the storage destination 1404 displays the storage destination of the storage server 120. When the scan execution button 1405 is selected, the hold scan control unit 508 performs the processing of step S1106. When the back button 1406 is selected, the hold scan control unit 508 returns to the personal scan ticket list screen (FIG. 13).

When the scan execution button 1405 is selected, the hold scan control unit 508 executes scan processing based on the scan setting 1402 in step S1106 and step S1107, and performs storage processing to store the image data that was generated by the scan in the specified storage destination. First, in step S1106, the hold scan control unit 508 of the image processing apparatus 100 executes the scan processing with the specified scan setting and generates image data (image file). Next, in step S1107, the hold scan control unit 508 of the image processing apparatus 100 performs a transmission request of the image file to the storage server 120. The transmission request for the image file includes an access token for user authentication defined in the scan ticket, a storage destination, and a scanned image file.

In step S1108, the storage application 121 of the storage server 120 checks with the authorization server 110 as to whether the access token received from the image processing apparatus 100 is valid. The storage application 121 transmits the access token that was included in the scan ticket acquired from the image processing apparatus 100 to the authorization server 110 to confirm the validity of the access token. In step S1109, the authorization application 111 of the authorization server 110 checks as to whether or not the access token that was transmitted from the storage server 120 is valid. In a case in which the access token is valid, the processing of step S1110 is performed.

In step S1110, the authorization application 111 of the authorization server 110 transmits the result of the access token validity check to the storage server 120. In step S1111, the storage application 121 of the storage server 120 checks the confirmation result of the access token that was received from the authorization server 110. In a case in which the access token is valid, the processing of step S1112 is performed. In contrast, in a case in which the access token was not valid, for example, the storage server 120 notifies the image processing apparatus 100 of the error, and displays an error screen on the image processing apparatus 100.

The following explains a case in which an access token is valid. In step S1112, the storage application 121 of the storage server 120 stores the image file in the storage destination that has been specified by the image processing apparatus 100, that is, the storage destination that was specified in the file transmission request of step S1107. In step S1113, the storage application 121 of the storage server 120 returns a storage result of the image file to the image processing apparatus 100.

In step S1114, the hold scan control unit 508 of the image processing apparatus 100 confirms the storage result that has been returned from the storage server 120 and displays a transmission result screen on the operation unit 102 according to the storage result. In a case in which the storage of the image file to the specified storage destination was successful, a display indicating that the image file was successfully stored is performed. Then, in a case in which the storage of the image file to the specified storage destination was successful, the processing of step S1115 is performed. In contrast, in a case in which the storage of the image file to the specified storage destination has failed, for example, an error display is performed, and the present sequence is terminated.

In step S1115, the hold scan control unit 508 of the image processing apparatus 100 determines whether or not the executed scan ticket is reusable. The hold scan control unit 508 determines the reusability of a scan ticket based on the reuse 905 of the scan ticket. In a case in which the scan ticket is reusable (TRUE), the scan ticket is held (stored) in the image processing apparatus 100 without being discarded. Thus, when the user opens the personal scan ticket list screen 1300 of FIG. 13 again, the scan ticket that executed the hold scan is displayed and the scan ticket can be reused. In contrast, in a case in which the scan ticket is not reusable (FALSE), the processing of step S1116 is performed. In step S1116, the hold scan control unit 508 of the image processing apparatus 100 discards all information of the scan ticket that executed the hold scan processing.

Figure 15:
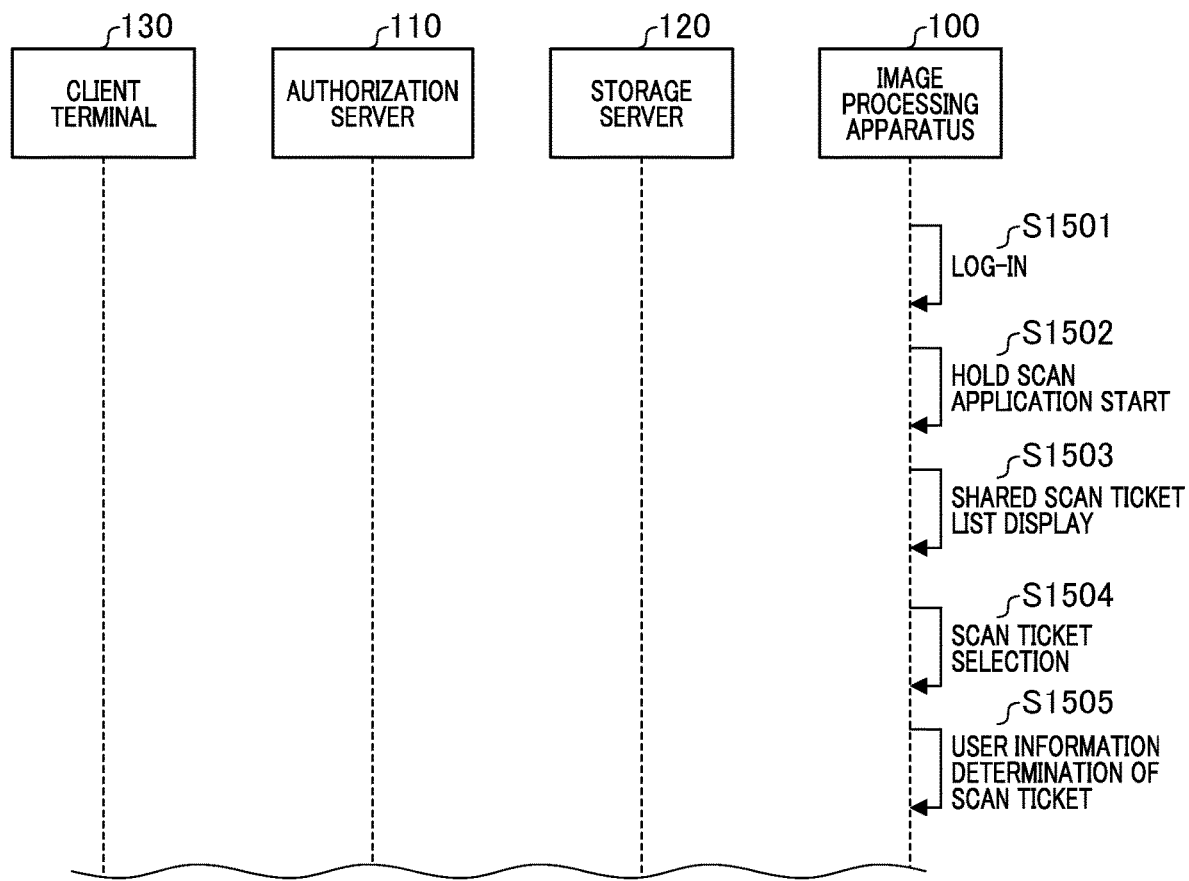
FIG. 15 is a sequence diagram showing hold scan processing.
Figure 16:
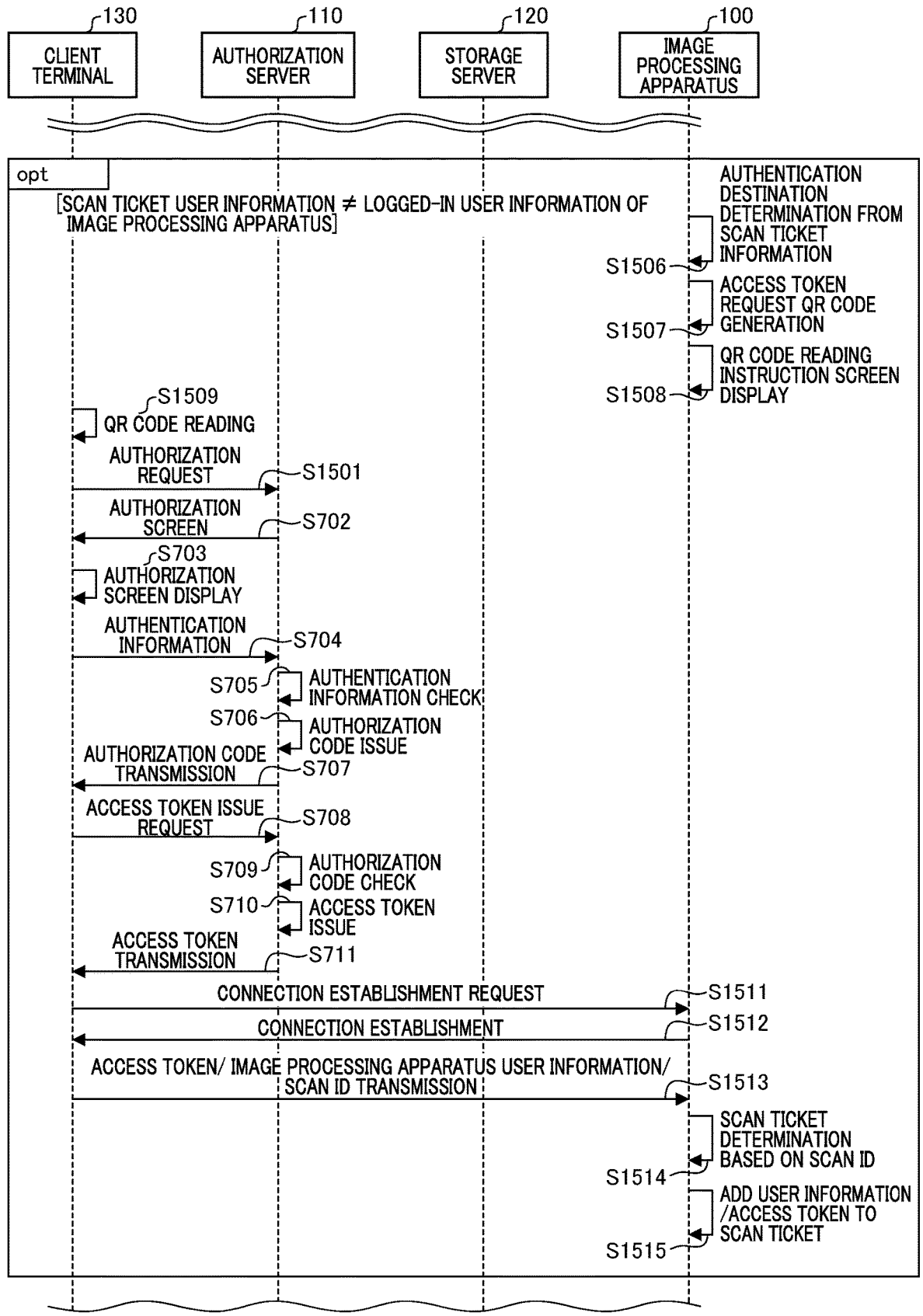
FIG. 16 is a sequence diagram showing hold scan processing.
Figure 17:
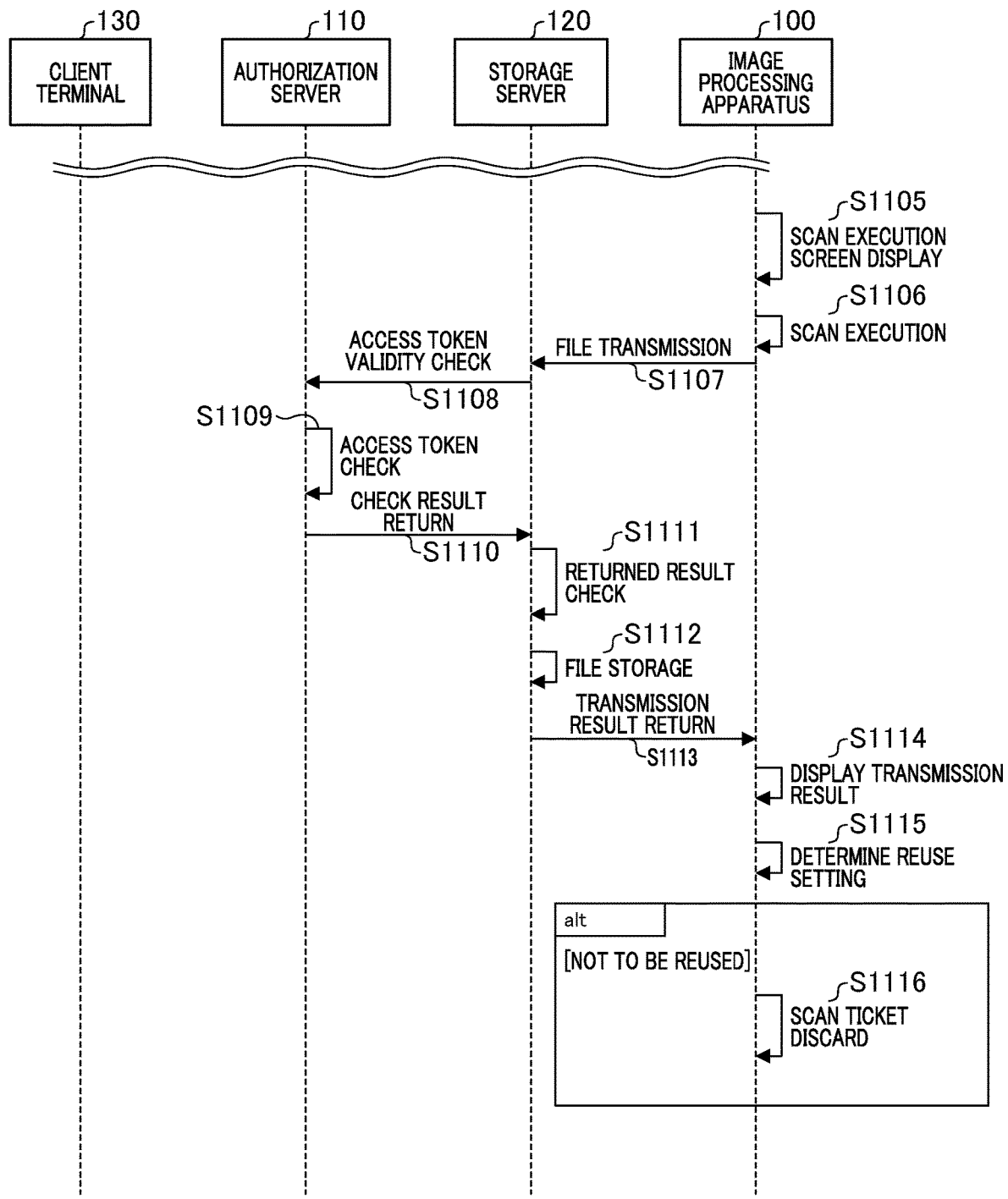
FIG. 17 is a sequence diagram showing hold scan processing.

FIG. 15 to FIG. 17 are sequence diagrams showing hold scan processing. In FIG. 11, a case in which the personal button 1201 has been selected on the scan ticket selection screen 1200 was explained. In FIG. 15 to FIG. 17, the processing of a case in which sharing is selected on the scan ticket selection screen 1200 will be explained. That is, a case in which the scan ticket is used by a different user than the user that is set in the selected scan ticket will be explained. Here, it is assumed that the scan ticket is held (stored) in the non-volatile area of the image processing apparatus 100 by the storage processing of the scan ticket that is shown in FIG. 6. In addition, the scan ticket is assumed to be a scan ticket in which the reuse 905 is set to TRUE, and the share 906 is set to TRUE. In the hold scan processing, processing, including scanning and transmission, is executed by an execution instruction that is made by specifying a scan job (scan ticket) by the operation of a user who has logged into the image processing apparatus 100. In the present embodiment, an example of storing a scanned image in the storage server 120 will be explained.

Each processing that is executed by the image processing apparatus 100 shown in FIG. 15 to FIG. 17 is realized by the CPU 201 loading a program stored in the FlashROM 210 into the DRAM 202 and executing the program. Each processing that is executed by the image processing apparatus 100 shown in FIG. 11 is realized by the CPU 401 loading the program stored in FlashROM 406 into the DRAM 402 and executing the program. In addition, each of the processing operations that is executed by the authorization server 110 and the storage server 120 shown in FIG. 11 is realized by each CPU 301 loading a program stored in the HDD 306 into the DRAM 302 and executing the program.

This process is initiated, for example, by a user selecting an icon corresponding to a hold scan in the operation unit 102 of the image processing apparatus 100. In step S1501, the operation control unit 501 of the image processing apparatus 100 receives a login operation by the user and executes a login processing. In the login processing, the operation control unit 501 identifies the user based on, for example, a combination of an ID and a password input by the user or information that has been read from the IC card of the user and the like.

In step S1502, the hold scan control unit 508 of the image processing apparatus 100 starts a hold scan application based on a user operation in the operation unit 102 and displays a scan ticket selection screen. For example, the hold scan control unit 508 displays the scan ticket selection screen 1200 shown in FIG. 12 on the operation unit 102 by the user selecting an icon corresponding to the hold scan application on the home screen displayed on the operation unit 102. Here, a case in which the shared button 1202 has been selected will be explained. The hold scan control unit 508 receives a selection of the user in the scan ticket selection screen 1200, and in a case in which the personal button 1200 is selected, the processing of step S1503 is performed.

Figure 18:
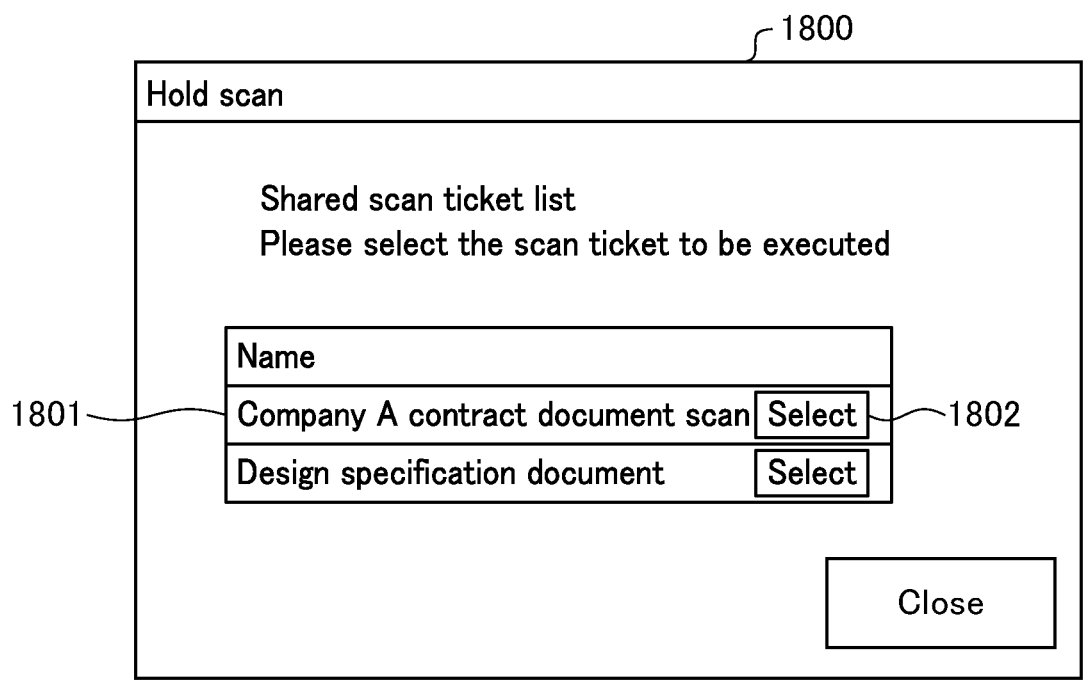
FIG. 18 is a diagram showing an example of a shared scan ticket list screen.

In step S1503, the hold scan control unit 508 of the image processing apparatus 100 displays a shared scan ticket list screen on the operation unit 102. FIG. 18 is a diagram showing an example of the shared scan ticket list screen. The shared scan ticket list screen 1800 displays a list of scan tickets for which the scan ticket share 906 is TRUE. The shared scan ticket list screen 1800 displays, for example, the name 1801 of the scan ticket and a button 1802 for selecting the scan ticket. In addition, the shared scan ticket list screen 1800 may display other information such as a scan setting or the date and time at which the scan ticket was stored. On the shared scan ticket list screen 1800, the user performs an operation of choosing the scan ticket they wish to execute by selecting the corresponding button 1802.

In step S1504, the hold scan control unit 508 of the image processing apparatus 100 accepts a selection of a scan ticket by the user. In step S1505, the hold scan control unit 508 of the image processing apparatus 100 checks the user information to confirm whether the scan ticket that was selected in step S1504 belongs to the user who has logged into the image processing apparatus 100. Specifically, the hold scan control unit 508 reads the ID of the user authentication 907 of the scan ticket selected in step S1504 and determines whether the ID matches the ID of the logged-in user of the image processing apparatus 100. In a case in which the user information on the scan ticket and the user information of the user logged into the image processing apparatus 100 match, the processing of step S1105 is performed. In contrast, in a case in which the user information on the scan ticket and the user information of the user logged into the image processing apparatus 100 do not match, that is, in a case in which a shared scan ticket of another person is used, the processing shown in steps S1506 to S1515 is performed.

The processing in a case in which the user information of the scan ticket and the user information of the user logged in to the image processing apparatus 100 do not match will be explained. In step S1506, the hold scan control unit 508 of the image processing apparatus 100 determines an authentication destination for acquiring an access token from the information of the scan ticket. For example, the hold scan control unit 508 identifies the authorization server 110 of the authentication destination to acquire the access token from the URL of the storage server 120 of the storage destination 903.

In step S1507, the hold scan control unit 508 of the image processing apparatus 100 generates a code image for requesting the issuance of an access token so as to access the storage server 120 for the user logged in to the image processing apparatus 100. Here, the access token requested is for access to the storage server 120 based on the authority of the user that is logged in to the image processing apparatus 100. The code image is a two-dimensional code, such as a QR code, that can be read by the client terminal 130. Information for causing the execution of a processing to acquire an access token is embedded in the code image. Specifically, the code image includes the authentication destination determined in step S1506, the user information of the user logged into the image processing apparatus 100, and the scan ticket ID 901 of the scan ticket that was selected in step S1504.

Figure 19:
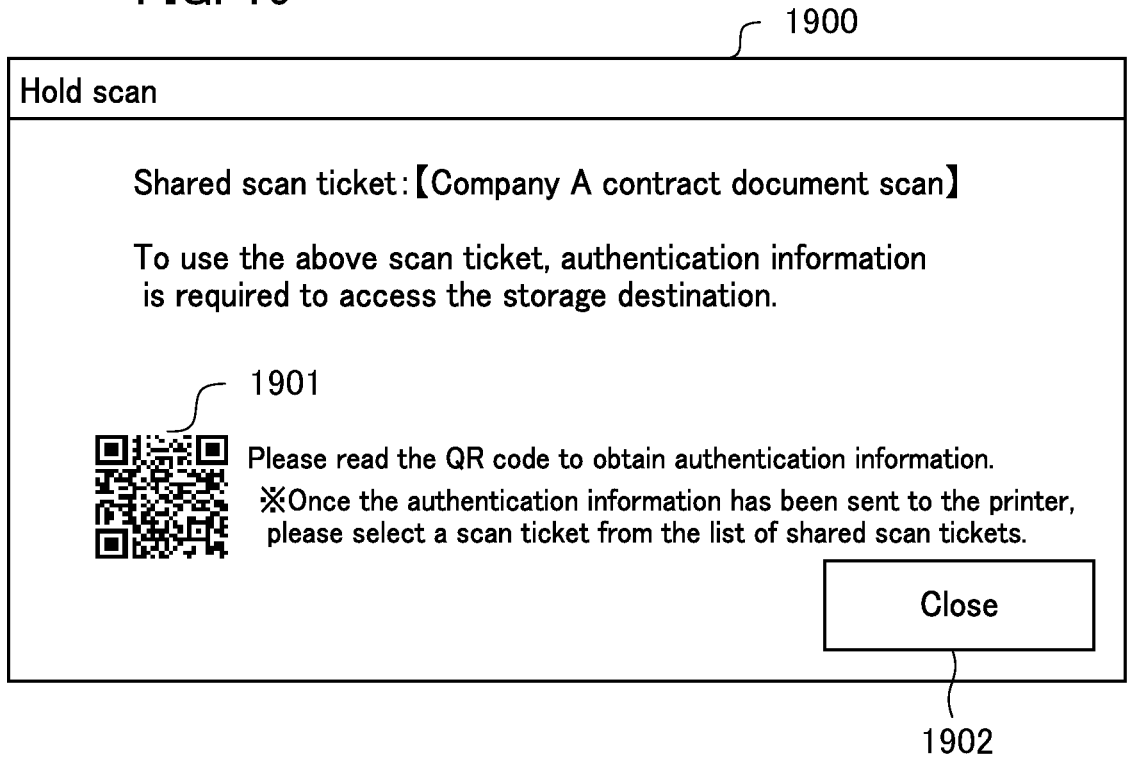
FIG. 19 is a diagram showing an example of an authentication information request screen.

In step S1508, the hold scan control unit 508 of the image processing apparatus 100 displays an authentication information request screen that includes the code image generated in step S1507 on the operation unit 102 so as to be readable by the client terminal 130. FIG. 19 is a diagram showing an example of the authentication information request screen. The authentication information request screen 1900 displays a code image 1901 and an instruction to the user to read the code image. In addition, the authentication information request screen 1900 also displays a close button 1902 for closing the authentication information request screen 1900. When the close button 1902 is selected, the hold scan control unit 508 performs control to return the display of the operation unit 102 to the shared scan ticket list screen 1800.

In step S1509, the hold scan application 131 of the client terminal 130 reads the code image 1901 that is displayed on the image processing apparatus 100 and acquires the information embedded in the code image. The hold scan application 131 reads the code image 1901 via, for example, a camera of the client terminal 130. The information acquired from the code image includes the authentication destination that was determined in step S1506, the user information of the user logged into the image processing apparatus 100, and the scan ticket ID 901 of the scan ticket that was selected in step S1504.

In step S1510, the hold scan application 131 of the client terminal 130 transmits an authorization request with respect to the storage access of the storage server 120 to the acquired authentication destination. In the present embodiment, the hold scan application 131 transmits an authorization request to the authorization server 110, which is the authentication destination. The authorization server that has received the authorization request from hold scan application 131 performs the processing of step S702. The subsequent processes from steps S702 to S711 are similar to those explained in FIG. 7, and therefore the explanation thereof is omitted by assigning the same reference numerals.

Figure 20A:
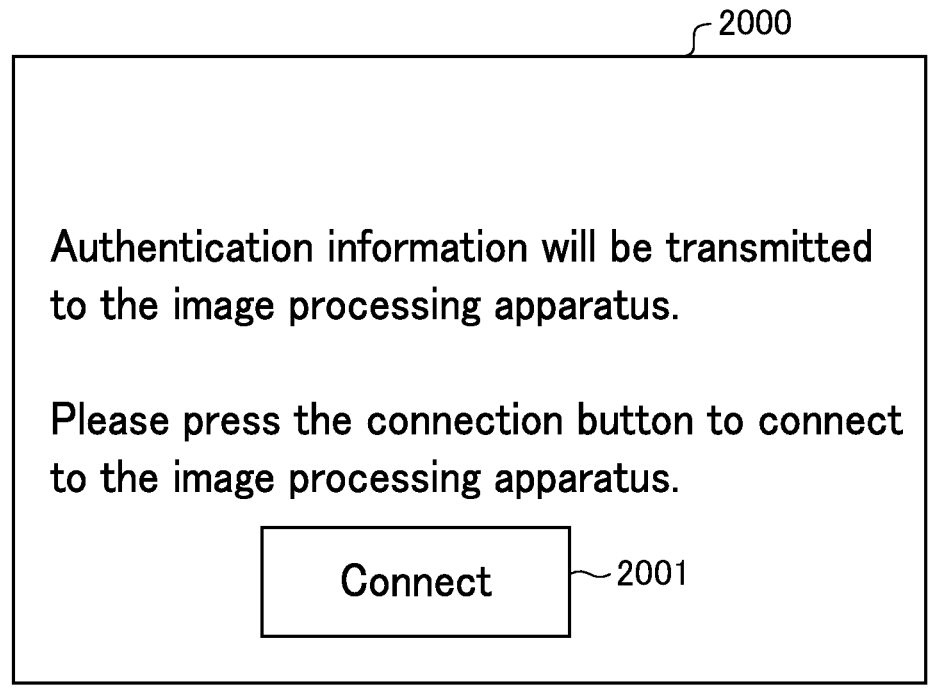
FIGS. 20A and 20B are diagrams showing examples of a connection request screen and an authentication information transmission completion screen.

The hold scan application 131 of the client terminal 130 that received an access token from the authorization server 110 in step S711 performs the processing of step S1511. In step S1511, the hold scan application 131 of the client terminal 130 transmits a connection establishment request to the image processing apparatus 100. The hold scan application 131 may display a connection request screen to the image processing apparatus 100 on a display of the client terminal 130 and transmit a connection establishment request to the image processing apparatus 100 in a case in which the user selects a connection. FIG. 20A is a diagram showing an example of a connection request screen. On the connection request screen 2000, for example, a message is displayed prompting the user to send authentication information to the image processing device and to select a connection button. Further, a connection button 2001 is displayed on the connection request screen 2000. Upon detecting the selection of the connection button 2001 by the user, the hold scan application 131 transmits a connection establishment request to the image processing apparatus 100. In step S1512, the network control unit 507 of the image processing apparatus 100 processes the connection establishment request from the client terminal 130, and establishes a connection for performing notification to the client terminal 130 from the image processing apparatus 100.

Figure 20B:
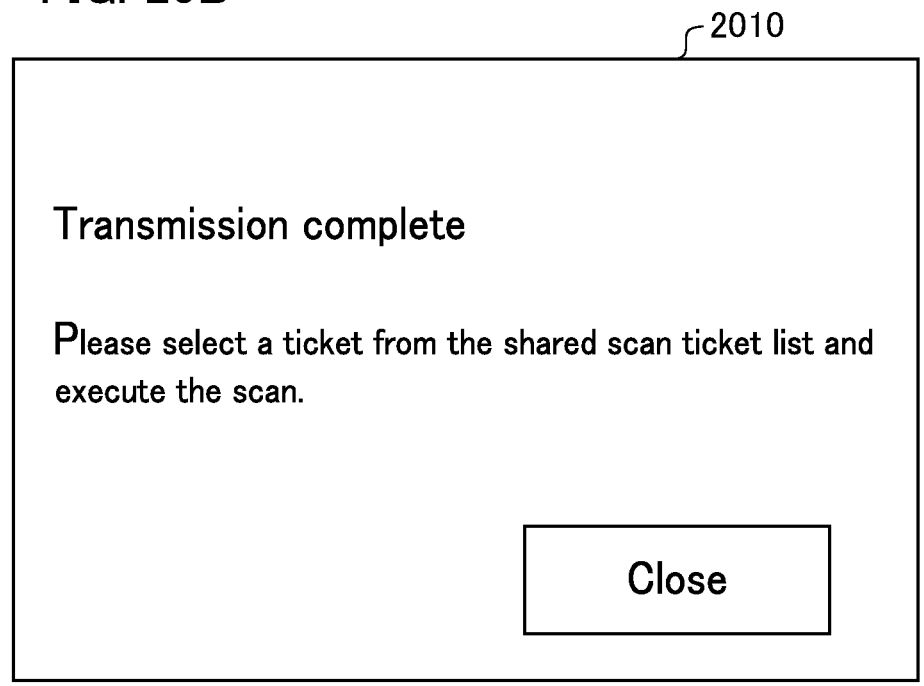

In step S1513, the hold scan application 131 of the client terminal 130 transmits to the image processing apparatus 100 the information that includes the access token that was acquired at step S711. Specifically, the hold scan application 131 transmits to the image processing apparatus 100 the user information of the user logged into image processing apparatus 100 that was acquired at step S1509, the scan ticket ID 901 of the scan ticket selected by the user, and the access token that was acquired at step S711. When the transmission is complete, the hold scan application 131 of the client terminal 130 displays an authentication information transmission completion screen on the display of the client terminal 130. FIG. 20B is a diagram showing an example of an authentication information transmission completion screen. On an authentication information transmission completion screen 2010, for example, a message indicating transmission completion is displayed.

In step S1514, the hold scan control unit 508 of the image processing apparatus 100 specifies the scan ticket based on the information that was received from the client terminal 130 at step S1513. Specifically, the hold scan control unit 508 specifies the scan ticket corresponding to the scan ticket ID 901 of the scan ticket that was received from the client terminal 130.

In step S1515, the hold scan control unit 508 of the image processing apparatus 100 adds the user information and the access token of the image processing apparatus 100 that were received from the client terminal 130 at step S1513 to the scan ticket information that was specified at step S1514. FIG. 21 is a diagram showing an example of a scan ticket after the processing of step S1515 is completed. A scan ticket 2100 is the same scan ticket as the scan ticket shown in FIG. 9. Assume that a user with the user authentication 907 ID of "xyz789" shared and used a scan ticket, identified by scan ticket ID 901 "abc@8754dolf", and associated with user authentication 907 ID "abc123" and access token "abcd9876qq". In this case, the hold scan control unit 508 of the image processing apparatus 100 performs the processing of step S1515 and generates a scan ticket 2101 with the received "xyz789" added to the user authentication 907 ID, and "xxx6543wyz" added to the access token. Thus, the scan ticket with scan ticket ID "abc@8754dolf" (scan ticket 2100 and scan ticket 2101) can be used by users with user authentication IDs of "abc123" and "xyz789". In addition, by using the access token of each user, it is possible for each user to access the storage server 120, which is the storage destination for the image data generated by a scan based on a scan ticket.

Figure 23:
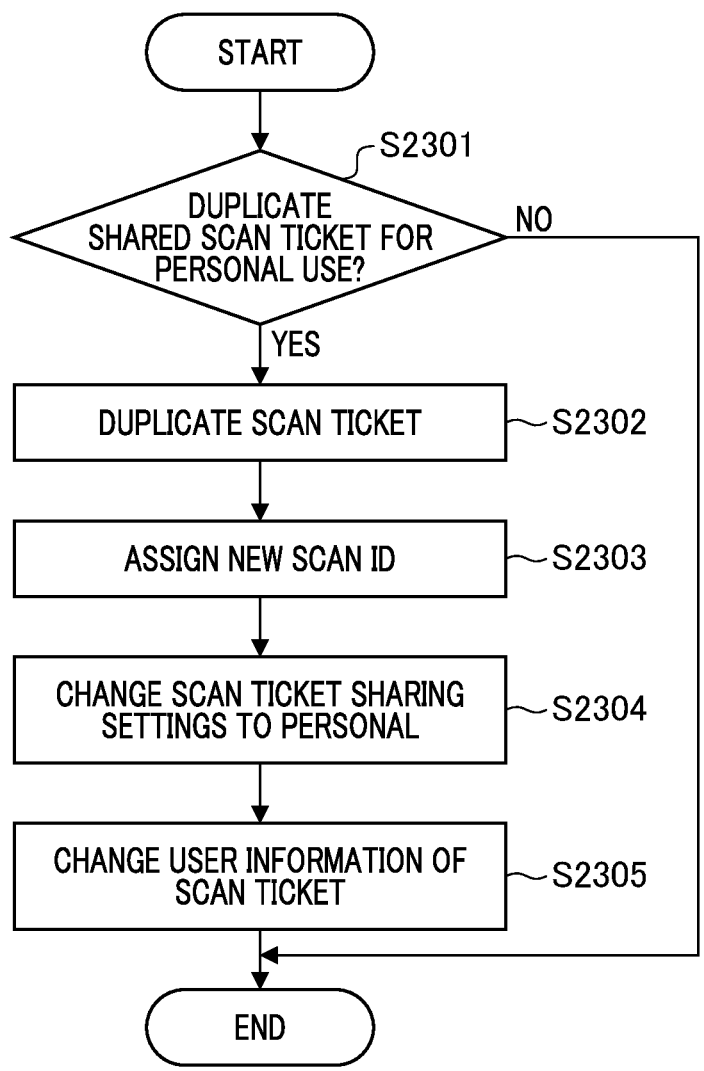
FIG. 23 is a flowchart showing the processing of generating a new personal scan ticket.
Figure 24:
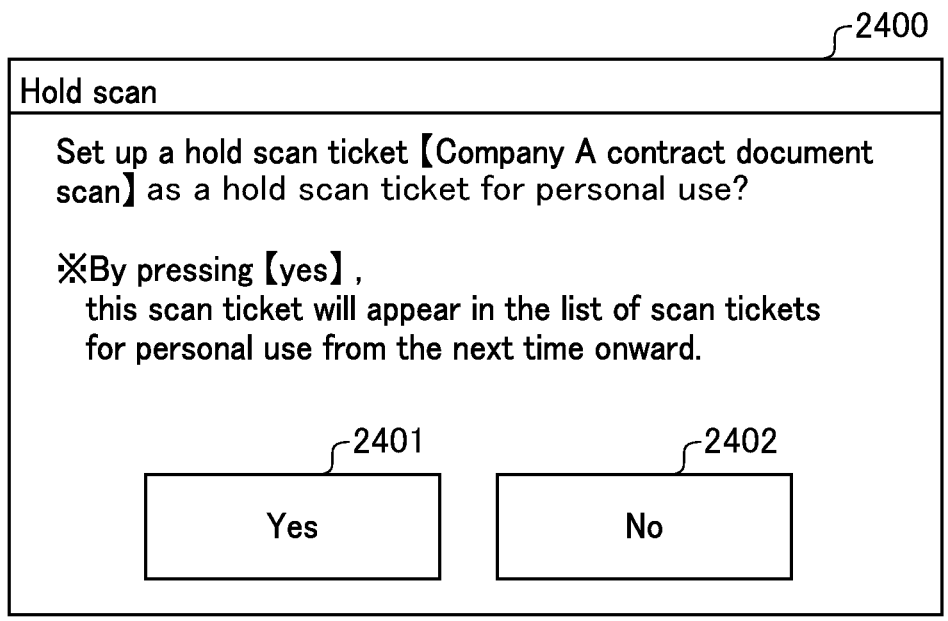
FIG. 24 is a diagram showing an example of a sharing setting change screen of a scan ticket.

In the subsequent sequence, the scan is performed by using the scan ticket 2101 to which the user authentication has been newly added, and the scanned image data is transmitted to the storage destination, which is the storage server 120. Because the content of this processing is similar to that of S1105 to S1116 with the only difference being the scan ticket that is used, descriptions thereof are omitted by assigning the same reference numerals. It should be noted that, in a case in which it has been determined that the reuse setting is TRUE in step S1115 after executing transmission processing that used the shared scan ticket, a sharing setting change screen 2300 of the scan ticket shown in FIG. 24 may be displayed, and the processing shown in FIG. 23 may be executed. FIG. 23 and FIG. 24 will be described below.

Figure 22:
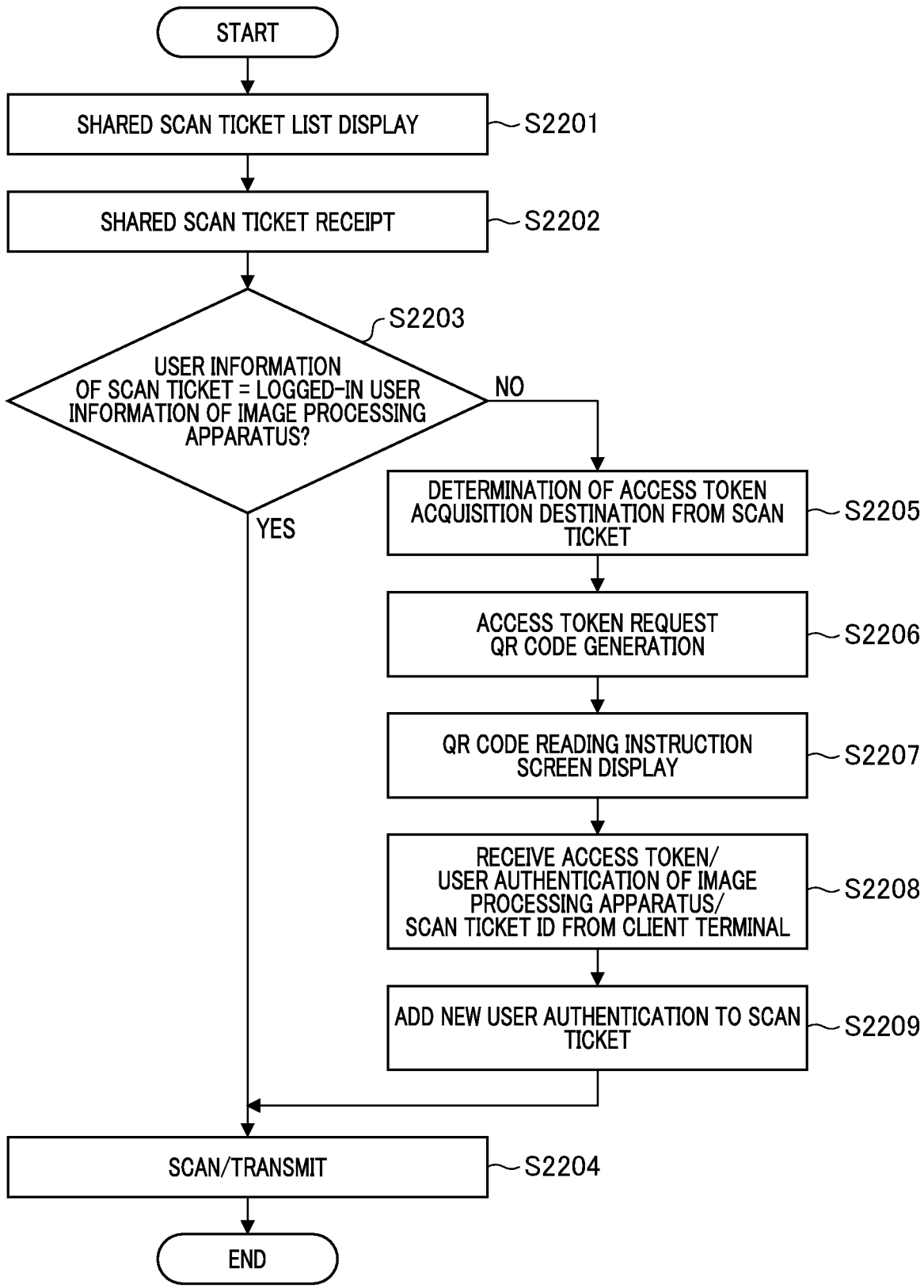
FIG. 22 is a flowchart showing access token request processing.

FIG. 22 is a flowchart showing an access token request processing of a shared scan ticket in the image processing apparatus 100. This processing is started upon detection of the selection of the share button 1202 on the scan ticket selection screen 1200 displayed on the operation unit 102 of the image processing apparatus 100. Each of the processing operations shown in FIG. 22 is realized by the CPU 201 of the image processing apparatus 100 loading a program stored in the FlashROM 210 into the DRAM 202 and executing the program.

In step S2201, the hold scan control unit 508 displays the shared scan ticket list screen 1800 (FIG. 18). Step S2201 is processing corresponding to step S1503 in FIG. 15. In step S2202, the hold scan control unit 508 accepts the selection of a shared scan ticket by the user. Selection of a shared scan ticket by the user is performed, for example, by pressing the button 1802 on the shared scan ticket list screen 1800. Step S2202 is processing corresponding to step S1504 in FIG. 15.

In step S2203, the hold scan control unit 508 reads the ID of the user authentication 907 of the scan ticket that was selected in step S2202, and determines whether the read ID matches the ID of the logged-in user of the image processing apparatus 100. In a case in which the IDs match, the processing of step S2204 is executed. In contrast, in a case in which the IDs did not match, the processing of step S2205 is performed. Step S2203 is processing corresponding to step S1505 in FIG. 15.

In step S2205, the hold scan control unit 508 determines a destination (authentication destination) for acquiring an access token based on information such as the storage destination 903 of the scan data included in the selected scan ticket. Step S2205 is processing corresponding to step S1506 in FIG. 16. In step S2206, the hold scan control unit 508 generates a code image in which information to execute the processing for acquiring an access token by the client terminal 130 is embedded. The code image includes information of the acquisition destination (authentication destination) of the access token that was specified in step S2205, a scan ticket ID 901 of the selected scan ticket, and information of the logged-in user authentication of the image processing apparatus 100. Step S2206 is processing corresponding to step S1507 in FIG. 16.

In step S2207, the hold scan control unit 508 displays the code image generated in step S2206 on the operation unit 102 so as to be readable by the client terminal 130. For example, the hold scan control unit 508 displays the authentication information request screen 1900 (FIG. 19) that includes the code image 1901 on the operation unit 102, and instructs the client terminal 130 to read the code image 1901. Step S2207 is the processing corresponding to step S1508 of FIG. 16. In the client terminal 130 that has read the code image 1901, the processing (step S1501 to step S711) to acquire an access token from the authorization server 110 is executed. Then, when the client terminal 130 establishes a connection with the image processing apparatus 100, it transmits the access token which was acquired from the authorization server 110, the user authentication information of the image processing apparatus 100, and the scan ticket ID 901 to the image processing apparatus 100.

In step S2208, the retention scan control unit 508 receives an access token, user authentication information of the image processing apparatus 100, and a scan ticket ID 901 from the hold scan application 131 of the client terminal 130. Step S2208 is the processing corresponding to step S1513 of FIG. 16. In step S2209, the hold scan control unit 508 adds the ID and the access token of the user authentication information of the image processing apparatus 100 received from the client terminal 130 to the user authentication 907 of the scan ticket corresponding to the received scan ticket ID 901. Step S2208 is processing corresponding to step S1514 and step S1515 of FIG. 16.

In step S2204, the hold scan control unit 508 causes the execution of scan processing and transmission processing based on the scan ticket. In a case in which the user ID does not match at step S2203, scan processing is performed at step S2204 by using the scan ticket that was processed at step S2209. Step S2204 is processing corresponding to step S1105 to step S1116 in FIG. 11.

In a case in which many shared scan tickets are registered in the hold scan control unit 508 of the image processing apparatus 100, it is not easy for the user to find available shared scan tickets. Therefore, by duplicating a shared scan ticket that has been used and registering it as a personal use scan ticket, the scan ticket will be displayed on the personal scan ticket list screen, making it become easier to select and use.

FIG. 23 is a flowchart showing the processing of generating a new personal scan ticket based on a shared scan ticket. In the processing of step S1115 (FIG. 17), after the reuse 905 has executed the scan processing and the transmission processing that used the TRUE shared scan ticket, it is determined that the scan ticket can be reused. In a case in which a scan ticket is set to be reused, a sharing setting change screen of the scan ticket is displayed. The processing that is shown in FIG. 23 is initiated by displaying the sharing setting change screen of the scan ticket. Each of the processing operations shown in FIG. 23 is realized by the CPU 201 of the image processing apparatus 100 loading a program stored in the FlashROM 210 into the DRAM 202 and executing the program.

Here, a sharing setting change screen of a scan ticket will be explained. FIG. 24 is a diagram showing an example of a sharing setting change screen of a scan ticket. A sharing setting change screen of a scan ticket 2400 displays a message asking if the scan ticket that was used is to be set as a personal use scan ticket, and a YES button 2401 and a NO button 2402. In a case in which the used scan ticket is set as a personal use scan ticket, the user selects the YES button 2401. In contrast, in a case in which the used scan ticket is not set as a personal use scan ticket, the user selects the NO button 2402.

In step S2301, the hold scan control unit 508 of the image processing apparatus 100 determines whether or not to duplicate the used shared scan ticket for personal use. In a case in which it was detected that the YES button 2401 was selected on the sharing setting change screen 2400, the hold scan control unit 508 determines that the shared scan ticket is duplicated for personal use, and performs the processing of step S2302. In a case in which it was detected that the NO button 2402 was selected on the sharing setting change screen 2400, the hold scan control unit 508 determines that the shared scan ticket is not duplicated for personal use, and terminates the processing.

In step S2302, the hold scan control unit 508 duplicates the shared scan ticket that was used. In step S2303, the hold scan control unit 508 assigns a new scan ticket ID 901 to the duplicated scan ticket. In step 2304, the hold scan control unit 508 sets the duplicated scan ticket as a personal use scan ticket. Specifically, the hold scan control unit 508 changes the share 906 of the duplicated scan ticket from TRUE to FALSE, and makes the duplicated scan ticket a personal use scan ticket. In step S2305, the hold scan control unit 508 changes the user information of the duplicated scan ticket, and stores the duplicated scan ticket. Specifically, the hold scan control unit 508 retains only the information corresponding to the user logged into the image processing apparatus 100 from the user authentication 907 of the duplicated scan ticket, and deletes information of other users.

For example, in a case in which a user having user ID xyz789 has used the shared scan ticket 2100 shown in FIG. 21, the scan ticket becomes associated with the user information of xyz789. When user xyz789, who has used the shared scan ticket, performs a selection to duplicate the scan ticket for personal use on the sharing setting change screen 2400, a new scan ticket 2110 based on scan ticket 2100 is generated via the processing shown in FIG. 23. The scan setting 901, the storage destination 903, the name 904, and the reuse 905 of the scan ticket 2110 are the same as for the scan ticket 2100. In contrast, the scan ticket ID 901 of the scan ticket 2110 is the newly assigned ID in step S2303, and is a different ID from the scan ticket ID 901 of the scan ticket 2100. In the share 906 of the scan ticket 2110, FALSE is set by the processing of step S2304, and the scan ticket 2110 is set to a personal use scan ticket. The user information of xyz789, who is the user that used the shared scan ticket 2100, is stored in the user authentication 907 of the scan ticket 2110 by the processing of step S2205. The scan ticket 2110 is a scan ticket that can only be used by the user having the user ID of xyz789.

In this manner, according to the present embodiment, in a case in which a scan ticket newly created by any user is reused by another user, it is possible to reuse the scan ticket simply by acquiring a new access token. Thus, it is possible to share a scan ticket which requires complicated settings among users, and improve the convenience of the reuse of scan tickets. In addition, in a case in which the user who created the scan ticket and the user who uses the scan ticket are different, it is possible to perform authentication at the storage destination based on the authorization of a user who actually uses the scan ticket.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120979, filed Jul. 28, 2022, which is hereby incorporated by reference wherein in its entirety.

What is claimed is:

1. An image processing apparatus provided with a scanner comprising:
a memory storing instructions; and
a processor executing the instructions causing the system to:
accept a selection of a ticket that has a sharing setting to share the ticket, wherein the ticket is stored in the image processing apparatus and includes one or more settings required for scan processing that is executed by the scanner and for transmission processing of a file that includes an image that has been generated by the scan processing;
acquire an access token based on authorization of a user that uses the ticket;
execute the scan processing according to a setting that is included in the ticket; and
execute the transmission processing according to the setting that is included in the ticket by using the acquired access token,
wherein in the ticket, it is possible to set whether or not the ticket that has been used in the scanning processing and the transmission processing can be reused, and
in a case in which the ticket is set not to be reused, the used ticket is discarded after the transmission processing is completed, and in a case in which the ticket is set to be reused, the used ticket is not discarded.

2. The image processing apparatus according to claim 1, wherein the processor performs control so as to display a screen that requests the access token in a case in which the ticket is used by a user that is different from the user that is set in the selected ticket.

3. The image processing apparatus according to claim 2, wherein the screen displays a code image in which information for causing the execution of processing to acquire the access token is embedded.

4. The image processing apparatus according to claim 3, wherein the information that is embedded in the code image includes information of an authentication destination of the access token, information that indicates the selected ticket, and user information of a user that uses the ticket.

5. The image processing apparatus according to claim 1, wherein the access token is used to store a file at a transmission destination in the transmission processing.

6. The image processing apparatus according to claim 1, wherein it is possible to newly create a ticket in which a different user is set from a user that is set in the ticket, based on a ticket that has a sharing setting to share the ticket.

7. A control method for an image processing apparatus provided with a scanner, the control method comprising:
accepting a selection of a ticket that has a sharing setting to share the ticket, wherein the ticket is stored in the image processing apparatus and includes one or more settings required for scan processing that is executed by the scanner and for transmission processing of a file that includes an image that has been generated by the scan processing;

acquiring an access token based on authorization of a user that uses the ticket;

executing the scanning processing according to a setting included in the ticket; and executing the transmission processing according to the setting that is included in the ticket by using the acquired access token, wherein in the ticket, it is possible to set whether or not the ticket that has been used in the scanning processing and the transmission processing can be reused, and in a case in which the ticket is set not to be reused, the used ticket is discarded after the transmission processing is completed, and in a case in which the ticket is set to be reused, the used ticket is not discarded.

8. A non-transitory storage medium storing a control program of image processing apparatus provided with a scanner, the control program causing a computer to perform each step of a control method for the image processing apparatus, the control method comprising:

accepting a selection of a ticket that has a sharing setting to share the ticket, wherein the ticket is stored in the image processing apparatus and includes one or more settings required for scan processing that is executed by the scanner and for transmission processing of a file that includes an image that has been generated by the scan processing;

acquiring an access token based on authorization of a user that uses the ticket;

executing the scanning processing and the transmission processing according to a setting included in the ticket; and executing the transmission processing according to the setting that is included in the ticket by using the acquired access token, wherein in the ticket, it is possible to set whether or not the ticket that has been used in the scanning processing and the transmission processing can be reused, and in a case in which the ticket is set not to be reused, the used ticket is discarded after the transmission processing is completed, and in a case in which the ticket is set to be reused, the used ticket is not discarded.

* * * * *